United States Patent [19]

Ohtsuka

[11] 4,369,672
[45] Jan. 25, 1983

[54] CHANGE-SPEED TRANSMISSION WITH SELECTIVE BYPASS OF HYDROKINETIC UNIT

[75] Inventor: Kunio Ohtsuka, Yokohama, Japan

[73] Assignee: Nissan Motor Company, Limited, Yokohama, Japan

[21] Appl. No.: 274,292

[22] Filed: Jun. 16, 1981

Related U.S. Application Data

[63] Continuation of Ser. No. 899,991, Apr. 25, 1978.

[30] Foreign Application Priority Data

May 13, 1977 [JP] Japan .................... 52-54206

[51] Int. Cl.³ ............................................. F16H 47/08
[52] U.S. Cl. ........................... 74/688; 74/665 R; 74/730
[58] Field of Search ............... 74/688, 718, 720, 720.5, 74/732, 740, 665 R, 679, 682, 705, 730; 192/3.23, 3.24, 3.27, 3.32

[56] References Cited

U.S. PATENT DOCUMENTS

| 2,736,407 | 2/1956 | Smirl | 74/688 X |
|---|---|---|---|
| 2,873,621 | 2/1959 | Simpson . | |
| 2,889,715 | 6/1959 | De Lorean | 74/688 |
| 2,949,047 | 8/1960 | Burckhardt | 192/3.24 X |
| 3,057,225 | 10/1962 | Snyder | 74/688 |
| 3,182,775 | 5/1965 | Schall | 74/3.27 |
| 3,188,885 | 6/1965 | Fisher | 74/688 |
| 3,246,542 | 4/1966 | Moan | 74/688 X |
| 3,440,901 | 4/1969 | Chambers . | |
| 3,507,168 | 4/1970 | Carp | 74/688 |
| 3,712,154 | 1/1973 | Welch . | |
| 3,722,323 | 3/1973 | Welch . | |
| 3,835,732 | 9/1974 | Mori | 74/688 |
| 3,986,413 | 10/1976 | Stockton | 74/688 |

FOREIGN PATENT DOCUMENTS 1530792 11/1964 Fed. Rep. of Germany .
2645988 10/1976 Fed. Rep. of Germany .
1153920 5/1956 France .
782389 9/1957 United Kingdom .

OTHER PUBLICATIONS

Buick Special, Dual Path Drive, Brochure.

Primary Examiner—Nile C. Byers, Jr.
Attorney, Agent, or Firm—Lowe, King, Price & Becker

[57] ABSTRACT

A change-speed transmission comprises: an input member; an output member; a hydrokinetic unit having a pump connected to the input member for simultaneous rotation therewith and a turbine; first and second clutches; a divider in the form of a planetary gear set; and a planetary gear train. The divider has a first, a second and a third rotary element, while, the planetary gear train also has a first, a second and a third rotary element. The first rotary element of the divider is connected to the first rotary element of the gear train for simultaneous rotation therewith, and the second rotary elements are connected to each other through the second clutch. The second or third rotary elements are connectable through a first or a torque split clutch to the input member. The turbine of the hydrokinetic unit is connectable to the other one of said second and third rotary elements. The output member is connected to the third rotary element of the gear train or divider. If the turbine is connected to one of the second or third rotary elements of the divider, the input member is connectable through the first clutch to the other one of said elements of the divider, and the output member is connected to the third rotary element of the gear train. If the output member is connected to the third rotary element of the divider, the turbine is connected to the third rotary element of the gear train; while, the input member is connectable through the first clutch to the second rotary element of the divider.

11 Claims, 19 Drawing Figures

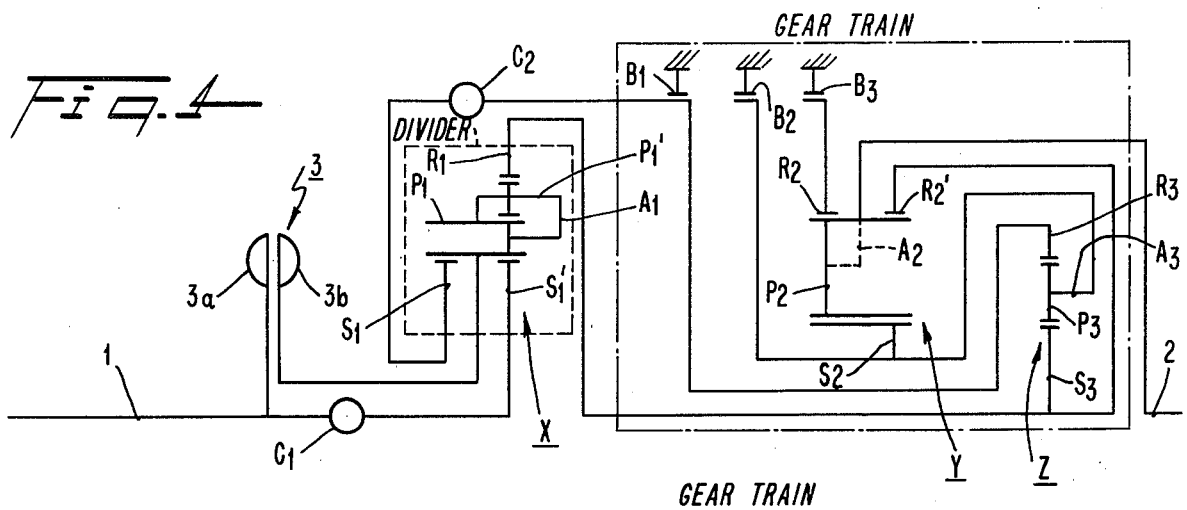
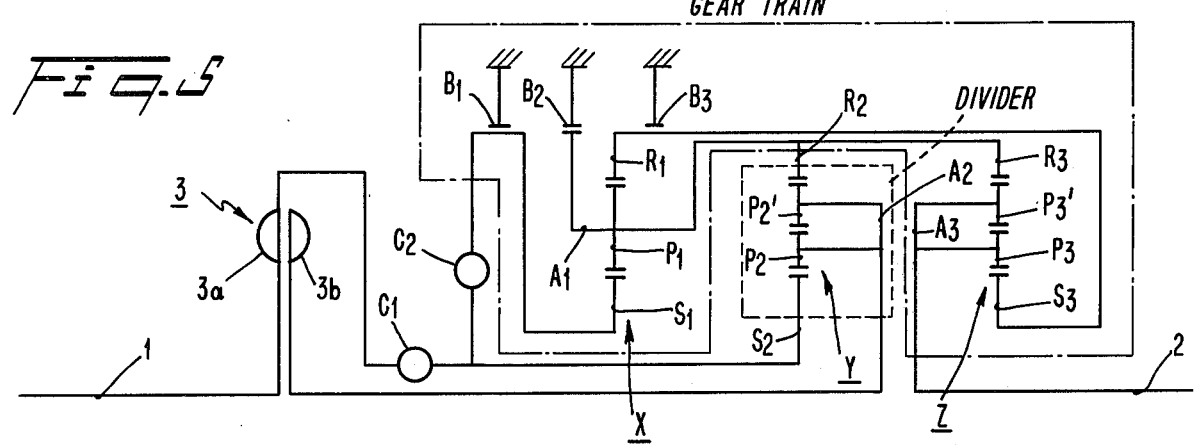
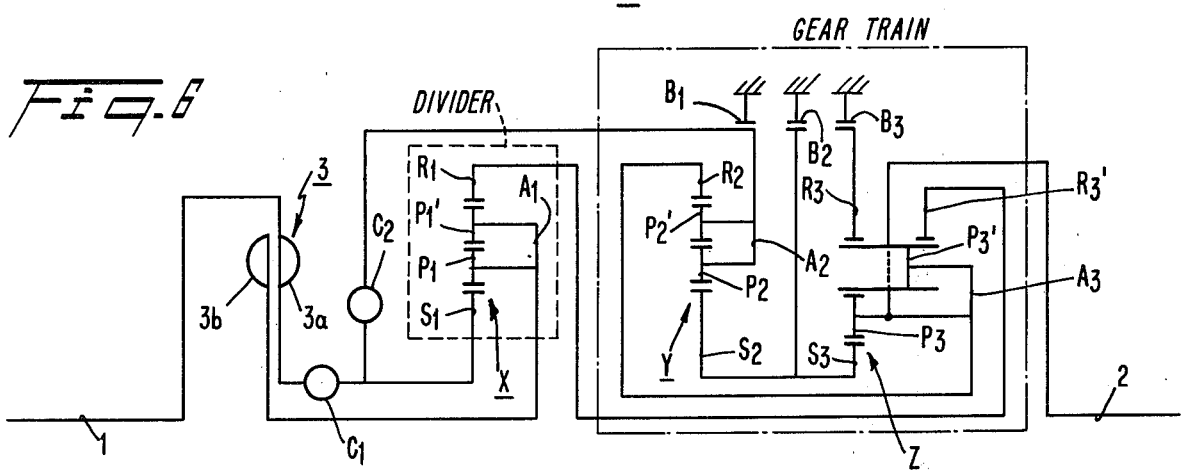
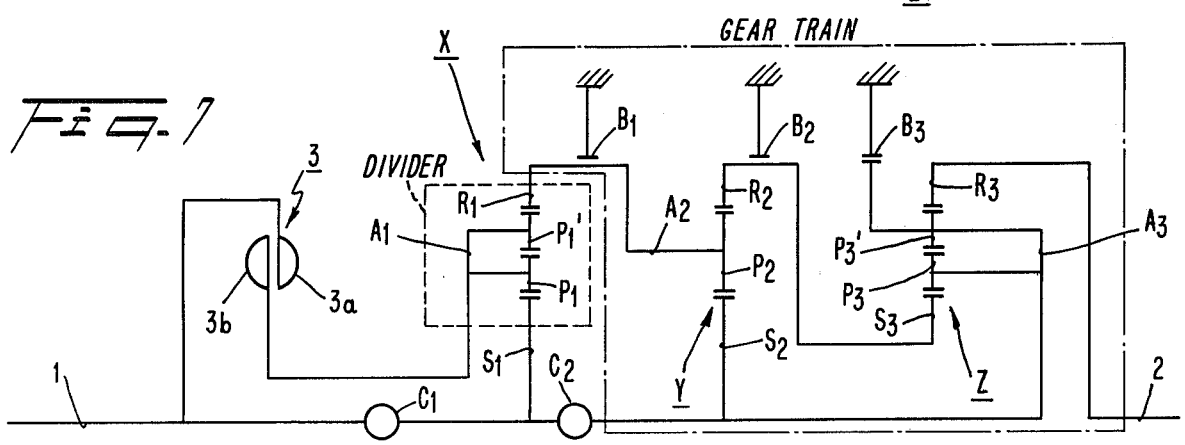

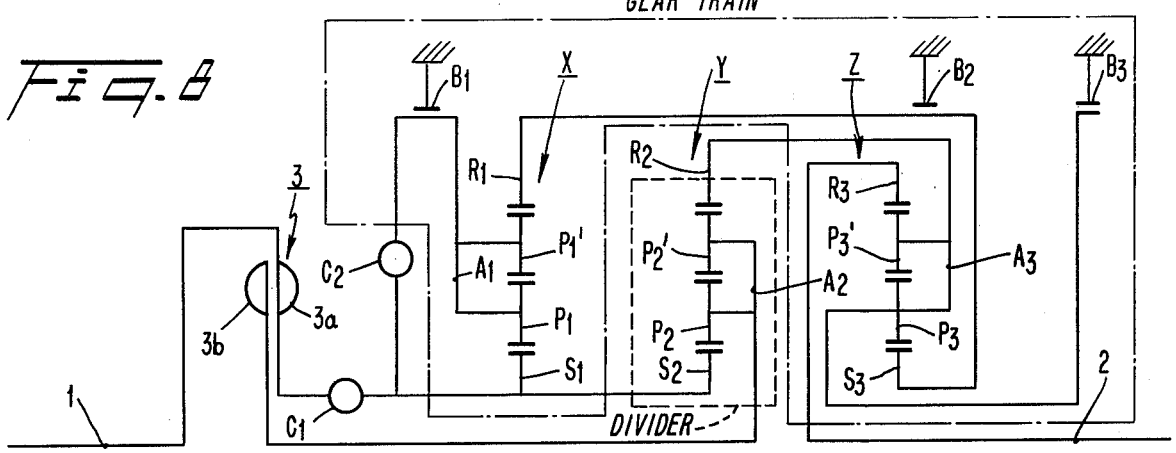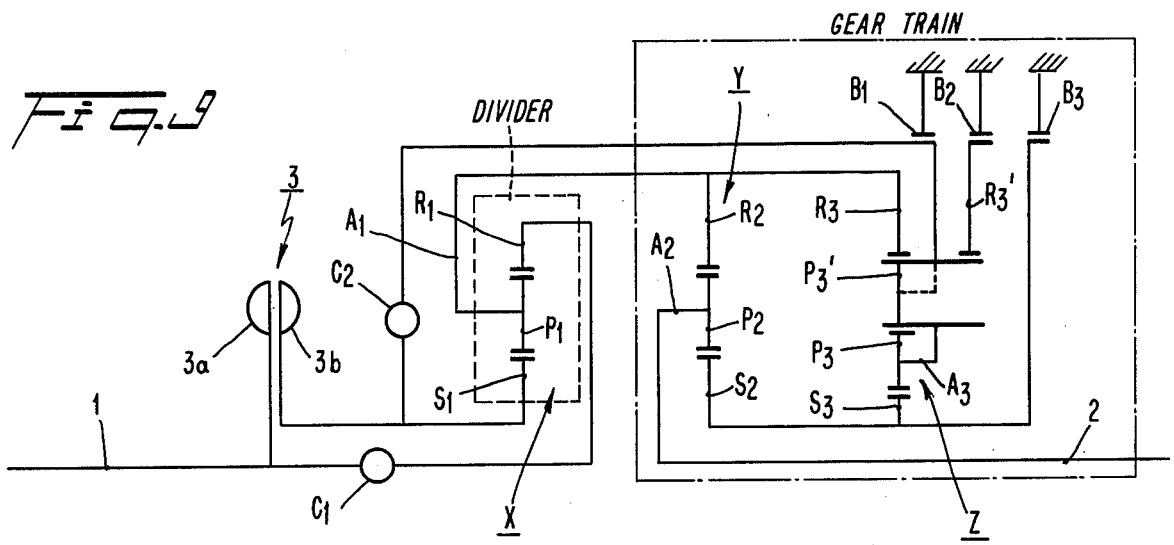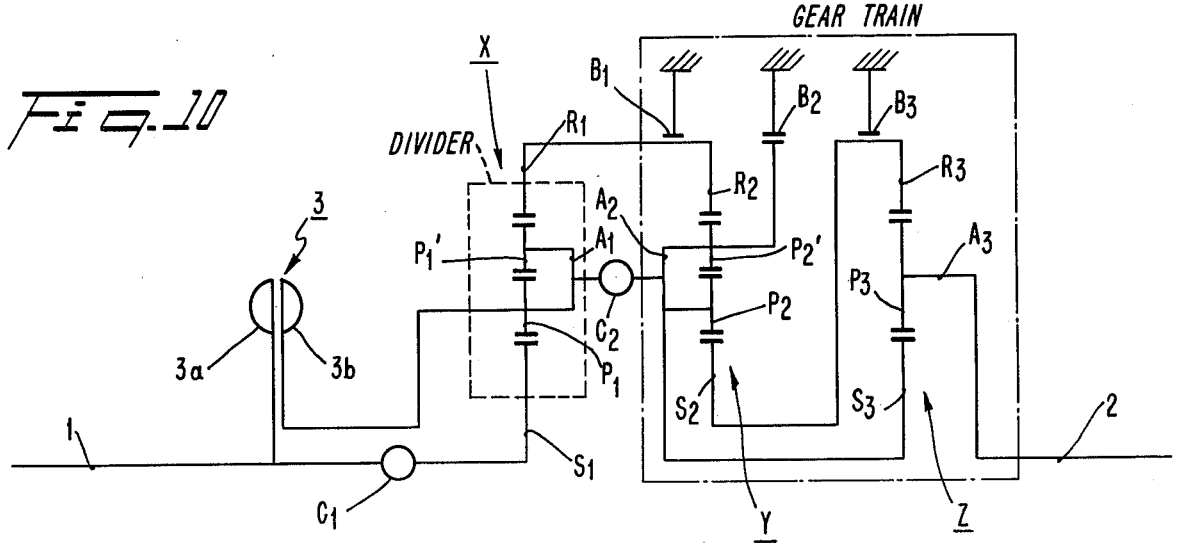

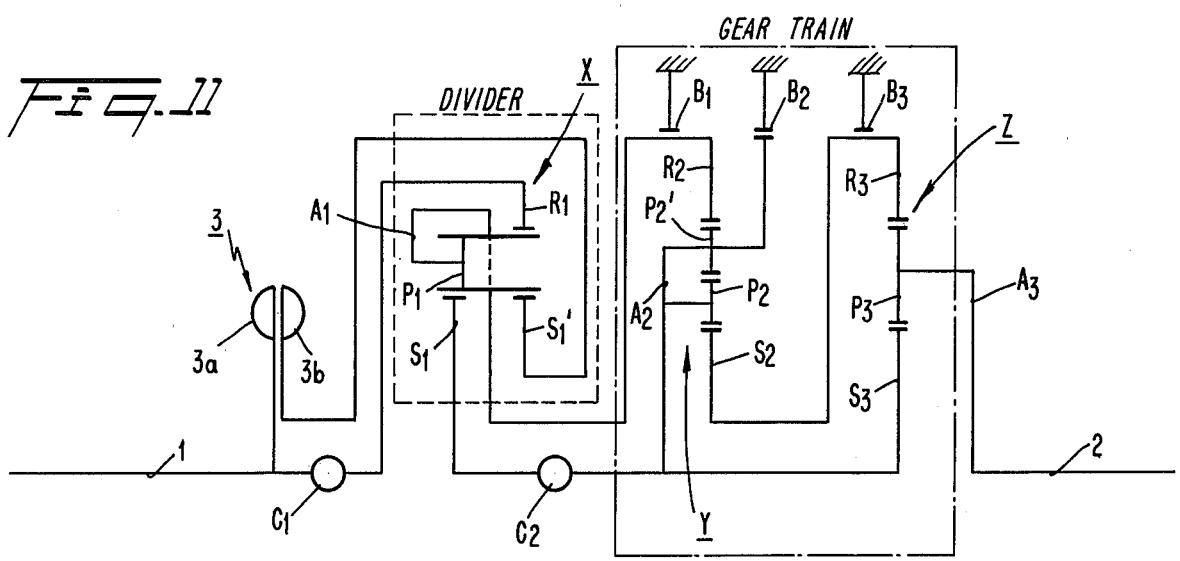
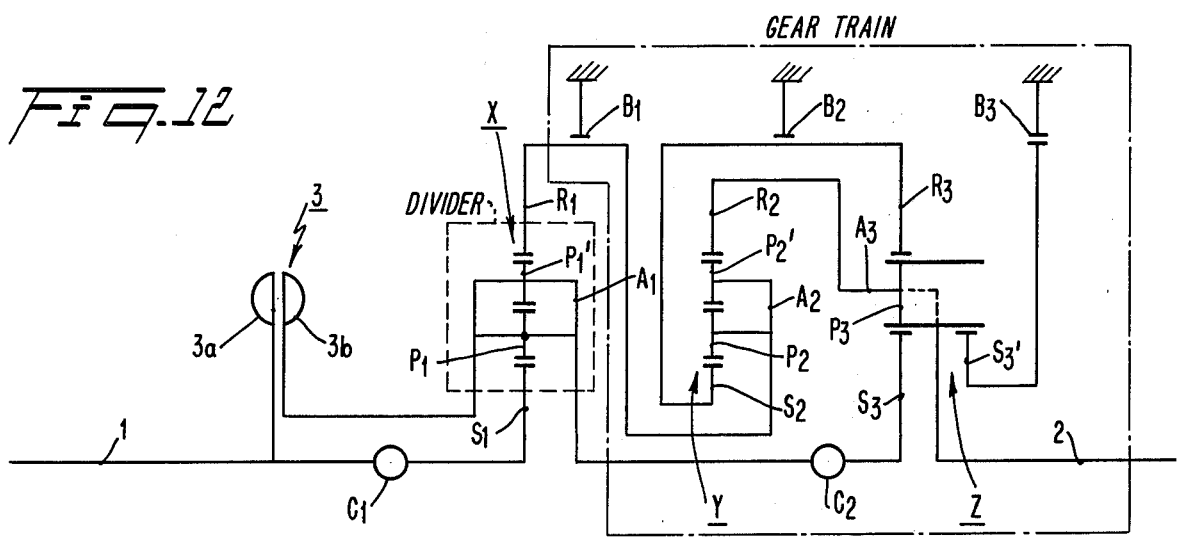
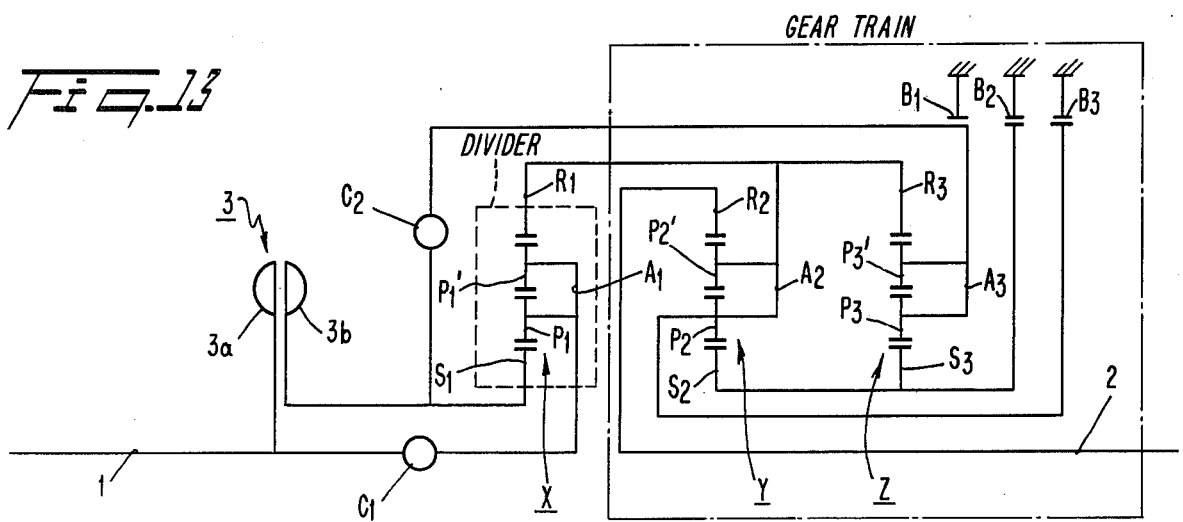

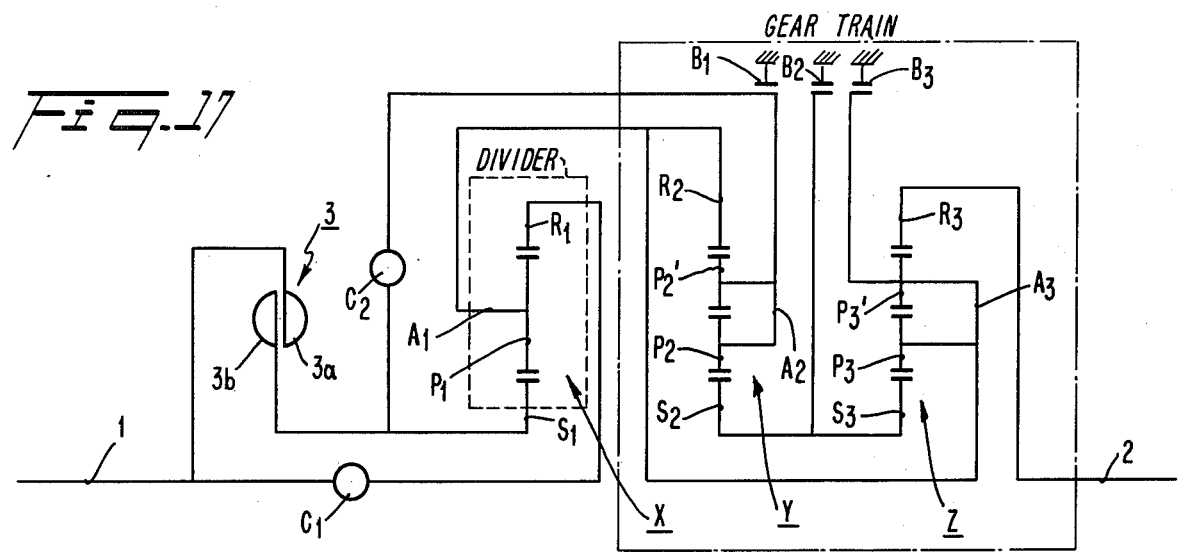
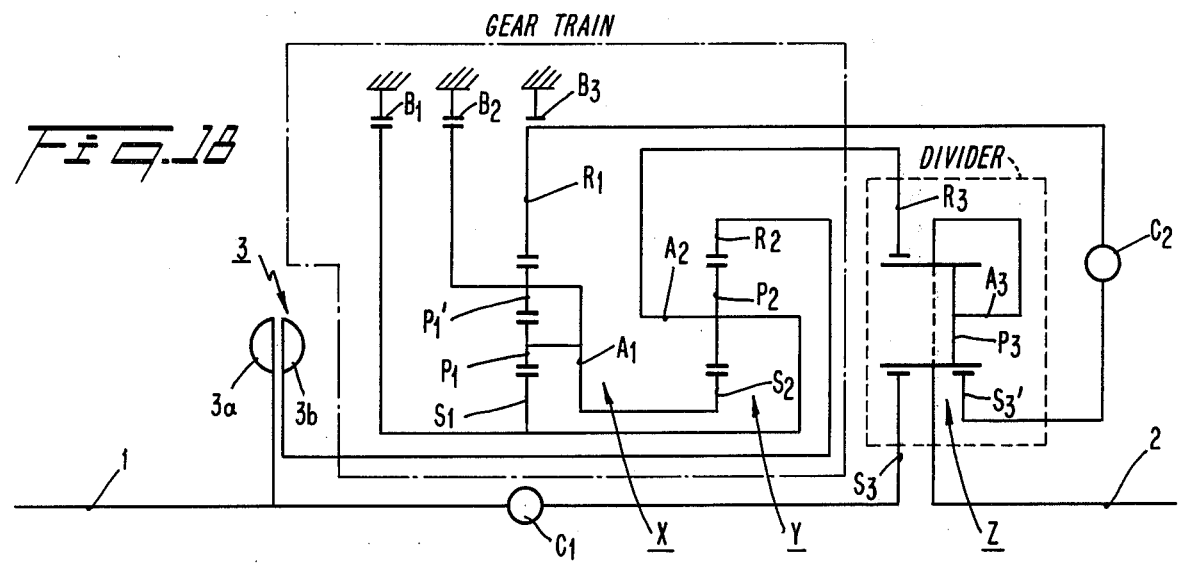
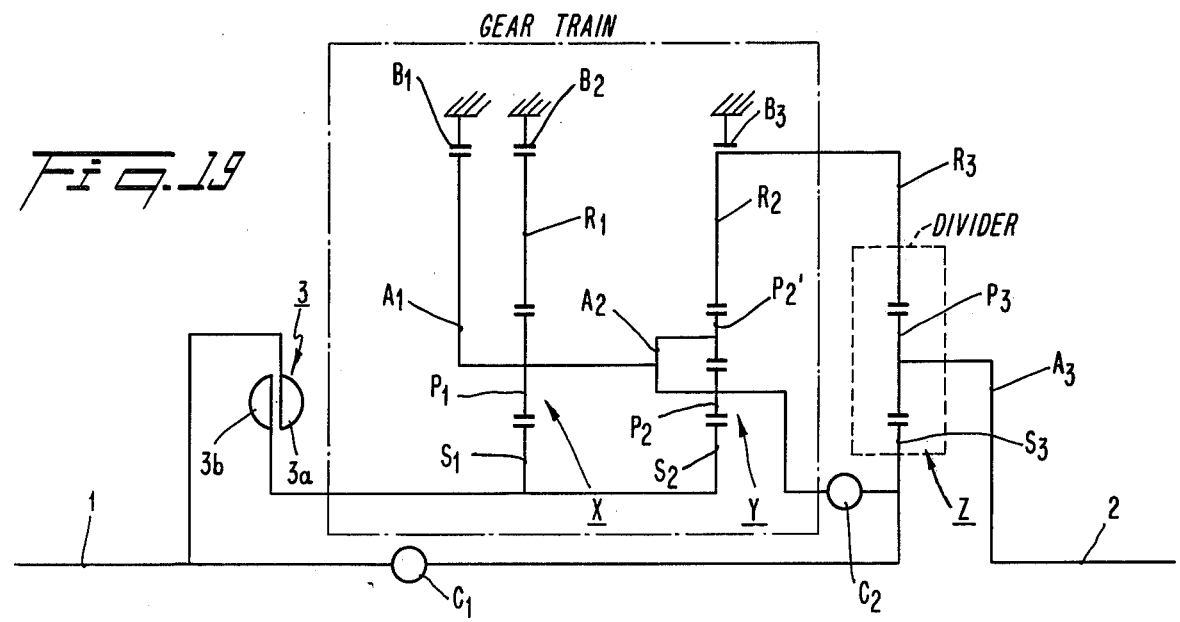

CHANGE-SPEED TRANSMISSION WITH SELECTIVE BYPASS OF HYDROKINETIC UNIT

This is a continuation of application Ser. No. 899,991, filed Apr. 25, 1978.

BACKGROUND OF THE INVENTION

The present invention relates to a change-speed transmission and more particularly to an automatic transmission comprising a hydrokinetic unit, such as a torque converter or a hydraulic coupling, a divider in the form of a planetary gear set, and a planetary gear train.

The conventional automatic transmissions using a hydrokinetic unit will provide smooth and effortless start-up of the automobile and shockless shifting as compared to the conventional manual transmissions. However, as there is a slip in a hydrokinetic unit, the automobile equipped with an automatic transmission using a hydrokinetic unit is worse in fuel economy than the automobile equipped with a manual transmission.

In order to improve fuel economy of an automobile equipped with an automatic transmission having a hydrokinetic unit, it has been proposed to provide a torque flow path bypassing the hydrokinetic unit which is selectively established by means of a clutch so that when the first forward speed is to be selected, the clutch is disengaged or uncoupled to make full use of the slip characteristics of the hydrokinetic unit for ease of start-up of the automobile. When another forward speed is to be selected, the clutch is engaged or coupled to establish the torque flow path so as to allow a portion of the input torque to flow through this direct path, although the balance portion of the engine torque is transmitted by the hydrokinetic unit. This torque split arrangement results in substantial reductions in the fuel consumption of the automobile.

There is known a two-speed automatic transmission, embodying the proposal described above, in which all of the input torque on an input member is transmitted through a hydrokinetic unit to provide the first forward speed and in which, to provide the second forward speed, the transmission of a portion of the input torque is effected through a first or torque split clutch bypassing the hydrokinetic unit with the balance portion of the input torque being transmitted by the hydrokinetic unit. This known transmission comprises: an input member; an output member; a hydrokinetic unit having a pump connected to the input member and a turbine; a divider in the form of a planetary gear set which has a ring gear connected to the turbine, a sun gear, and a carrier, which is in turn connected to the output member. The sun gear is connectable through a first or forward clutch to the input member. The first clutch is engaged upon selection of the second forward speed to permit a portion of the input torque to be transmitted directly to the output member bypassing the hydrokinetic unit. This automatic transmission has limited application, and particularly is not well suited for an automobile, such as a passenger car of the type in use today, because it has only two forward speeds so that it can not meet the varied demands for every day operating conditions.

SUMMARY OF THE INVENTION

Thus, an object of the invention is to provide a change-speed automatic transmission for an automobile, particularly a passenger car, which substantially increases the fuel economy of the automobile.

Another object of the invention is to provide a change-speed automatic transmission, including a divider in the form of a planetary gear set and a torque split clutch, providing more than two forward speeds and at least a portion of the upper or higher speeds of the transmission bypassing the hydrokinetic unit.

Still another object of the invention is to provide a change-speed automatic transmission having a wide range of gear ratios constructed of a minimum number of key subcombination component parts, namely, (1) a torque split clutch to bypass the hydrokinetic unit, (2) a divider, and (3) planetary gear train of one or more planetary gear sets.

A change-speed transmission of the invention comprises: an input member; a hydrokinetic unit having a pump connected to the input member and a turbine; a divider in the form of a planetary gear set which has a first, a second and a third rotary element; a planetary gear train having a first, a second and a third rotary element; and an output member. The divider and planetary gear train is so interconnected as to reduce the component parts needed for an effective full-range automative transmission, thus reducing the initial cost as well as the operating expenses. More particularly, the first rotary element of the divider is connected to the first rotary element of the planetary gear train, while, the second rotary element of the divider is connectable through a clutch (a second clutch) to the second rotary element of the gear train The output member in two series of embodiments of the present invention is connected to the third rotary element of the planetary gear train. In this case, the turbine is connected to one of the second or third rotary elements of the divider, while, the input member is connectable through another clutch (a first clutch) to the other one of these rotary elements of the divider. In at least one embodiment, a fourth rotary element of said gear train is connected to the second rotary element of the divider.

Another series of alternative embodiments are provided. For example, if desired, the output member may by connected to the third rotary element of the divider. In this case, the turbine is connected to the third rotary element of the gear train, while, the input member is connectable through a clutch to the second rotary element of the divider.

Accordingly, various embodiments of a change-speed transmission of the invention are illustrated in the accompanying drawings, as follows.

DESCRIPTION OF THE DRAWINGS

In the accompanying drawings:

FIGS. 1 to 8 are schematic diagrams of a first series of eight embodiments of a change-speed transmission of the invention which has the common features: (1) an output member is connected to a third rotary element of a planetary gear train; (2) a turbine of a hydrokinetic unit is connected to a third rotary element of a divider in the form of a planetary gear set; and (3) an input member connected to a pump of the hydrokinetic unit being also connectable through a first clutch ($C_1$) to a second rotary element of the divider.

FIGS. 9 to 17 are schematic diagrams of a second series of nine additional embodiments of a change-speed transmission of the invention which has the common feature: (1) an output member is connected to a third rotary element of a planetary gear train; (2) a turbine of a hydrokinetic unit is connected to a second rotary element of a divider in the form of a planetary gear set; and (3) an input member connected to a pump of the hydrokinetic unit is connectable through a first clutch ($C_1$) to a third rotary element of the divider.

FIGS. 18 and 19 are schematic diagrams of still another or third series of two additional embodiments of a change-speed transmission of the invention which has the common feature: (1) an output member is connected to a third rotary element of a divider in the form of a planetary gear set; (2) a turbine of a hydrokinetic unit is connected to a third rotary element of a planetary gear train, and (3) an input member connected to a pump of the hydrokinetic unit is connectable through a first clutch ($C_1$) to a second rotary element of the divider.

GENERAL DESCRIPTION OF THE EMBODIMENTS

To facilitate understanding of and comparison between the embodiments illustrated in FIGS. 1 to 19, a divider in the form of a planetary gear set is enclosed by a broken (dash) line box, while, a planetary gear train enclosed by an imaginary (dash-dot) line box; a first or a torque split clutch is denoted by $C_1$ and a second clutch by $C_2$.

DETAILED DESCRIPTION OF THE PREFERRED EMBODIMENTS

Figure 1:
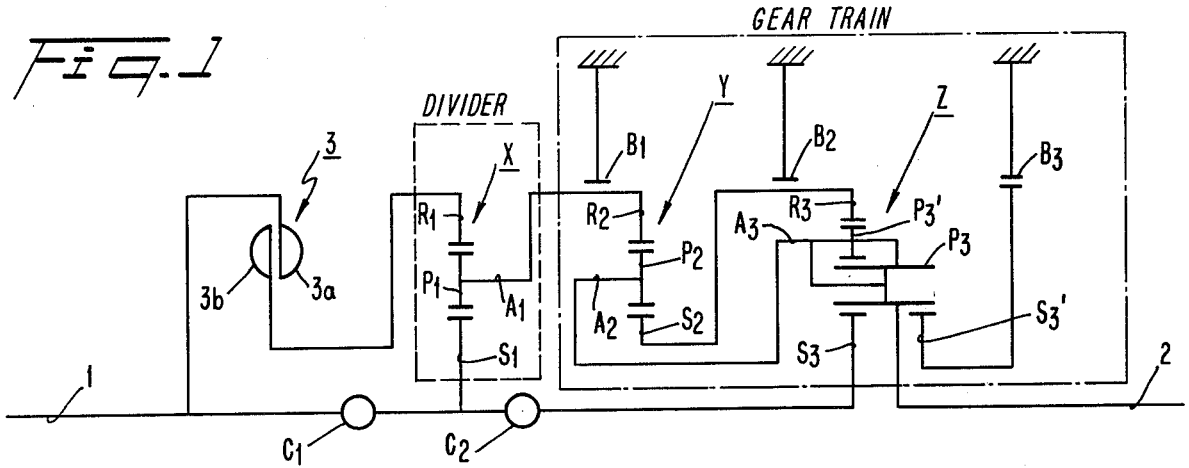

FIG. 1 shows a first embodiment of a change-speed transmission according to the invention in which the reference numeral 1 indicates an input shaft, the reference numeral 2 an output shaft and three planetary gear sets X, Y and Z are arranged with their axes aligned with the input and output shafts 1 and 2.

First planetary gear set X is a basic or simple planetary gear set and is used in this combination as a divider. The gear set comprises a first sun gear $S_1$, a first ring gear $R_1$ and a carrier $A_1$ (first rotary element of this particular embodiment) rotatably supporting a plurality of first pinions $P_1$, each meshing both with the sun gear $S_1$ (second rotary element of this particular embodiment) and ring gear $R_1$ (third rotary element of this particular embodiment).

Second planetary gear set Y is a simple planetary gear set, similar to the first planetary gear set, which comprises a second sun gear $S_2$, a second ring gear $R_2$ (first rotary element of this particular embodiment) and a second carrier $A_2$ rotatably carrying a plurality of second pinions $P_2$, each meshing both with the sun gear $S_2$ and ring gear $R_2$.

Third planetary gear set Z is a dual-intermeshed planet pinion planetary gear set which comprises two third sun gears $S_3$ and $S_3'$ (second rotary element of this particular embodiment), a third ring gear $R_3$ and a third carrier $A_3$ rotatably supporting a plurality of pairs of intermeshing pinions $P_3$ (third rotary element of this particular embodiment) and $P_3'$. Each pinion $P_3$ meshes with both of the third sun gears $S_3$ and $S_3'$, while, each pinion $P_3'$ meshes with the ring gear $R_3$. The third gear set Z in combination with the second gear set Y forms the planetary gear train of this first series of embodiments.

In the first planetary gear set X, the following equation holds.

$$N_{R1} + \alpha_1 N_{S1} = (1 + \alpha_1) N_{A1} \tag{1}$$

In second planetary gear set Y, the following equation holds.

$$N_{R2} + \alpha_2 N_{S2} = (1 + \alpha_2) N_{A2} \tag{2}$$

In third planetary gear set Z, the following equation holds.

$$N_{R3} - \alpha_3 N_{S3} = (1 - \alpha_3) N_{A3} \tag{3}$$

where, $N_{R1}$, $N_{R2}$ and $N_{R3}$ denote number of rotations of the ring gears of three planetary gear sets X, Y and Z, respectively.

$N_{S1}$, $N_{S2}$ and $N_{S3}$ denote number of rotations of the sun gears of three planteary gear sets X, Y and Z, respectively.

$N_{A1}$, $N_{A2}$ and $N_{A3}$ denote number of rotations of the carriers of the three planetary gear sets X, Y and Z, $\alpha_1$, $\alpha_2$ and $\alpha_3$ denote the ratio of number of teeth of a sun gear to that of a ring gear in the three planetary gear sets X, Y and Z, respectively.

The transmission comprises an input shaft 1 for supplying the input torque and a hydrokinetic unit or hydraulic torque converter 3 having a pump 3a connected to said input shaft 1 for simultaneous rotation therewith. A turbine 3b is connected to ring gear $R_1$ for simultaneous rotation therewith. Sun gear $S_1$ is connectable to input shaft 1 through a first clutch $C_1$ and connectable also to sun gear $S_3$ through a second clutch $C_2$. Carrier $A_1$ is connected to ring gear $R_2$ for simultaneous rotation therewith and both can be braked by means of a first brake $B_1$. Sun gear $S_2$ is connected to ring gear $R_3$ for simultaneous rotation therewith and can be braked by means of a second brake $B_2$. Carrier $A_2$ is connected to carrier $A_3$ for simultaneous rotation therewith and the carrier $A_3$ is connected to output shaft 2 to provide the output torque of the transmission. Sun gear $S_3'$ can be braked by means of a third brake $B_3$.

The operating sequence of two clutches $C_1$ and $C_2$ and three brakes $B_1$, $B_2$ and $B_3$ of the transmission is tabulated in Table 1, in which legend O denotes engagement condition of a clutch or application condition of a brake. Gear ratio and direct transmission rate, i.e., the rate of a portion of a torque transmitted through clutch $C_1$ bypassing torque converter 3 to all of the input torque, are calculated on the assumption that $\alpha_1 = \alpha_2 = \alpha_3 = 0.45$.

TABLE 1

| | $C_1$ | $C_2$ | $B_1$ | $B_2$ | $B_3$ | | Gear Ratio | Direct Transmission Rate (%) |
|---|---|---|---|---|---|---|---|---|
| 1st speed | | | O | | O | $(1 + \alpha_1)(1 + \alpha_2) + \left(\dfrac{\alpha_1}{\alpha_3}\right)(1 - \alpha_3)$ | 2.652 | 0 |
| 2nd speed | O | | | | O | $1 + \alpha_2$ | 1.450 | 31 |
| 3rd speed | O | | | O | | $1 + \alpha_2 \alpha_3$ | 1.202 | 31 |
| 4th speed | O | O | | | | 1.0 | 1.000 | 42.6 |

TABLE 1-continued

| | $C_1$ | $C_2$ | $B_1$ | $B_2$ | $B_3$ | | Gear Ratio | Direct Transmission Rate (%) |
|---|---|---|---|---|---|---|---|---|
| Rev. | | 0 | | | 0 | $-\dfrac{\alpha_1(1+\alpha_2\alpha_3)}{\alpha_2\alpha_3}$ | $-2.672$ | 0 |

Referring to FIGS. 2 through 19, the other embodiments will be described hereinafter. In these embodiments, like reference numerals and characters to those used in FIG. 1 are used to denote like component parts. Since the same or similar function is being carried out in each instance by the parts with like references, no additional or distinguishing identification is necessary or desirable.

Figure 2:
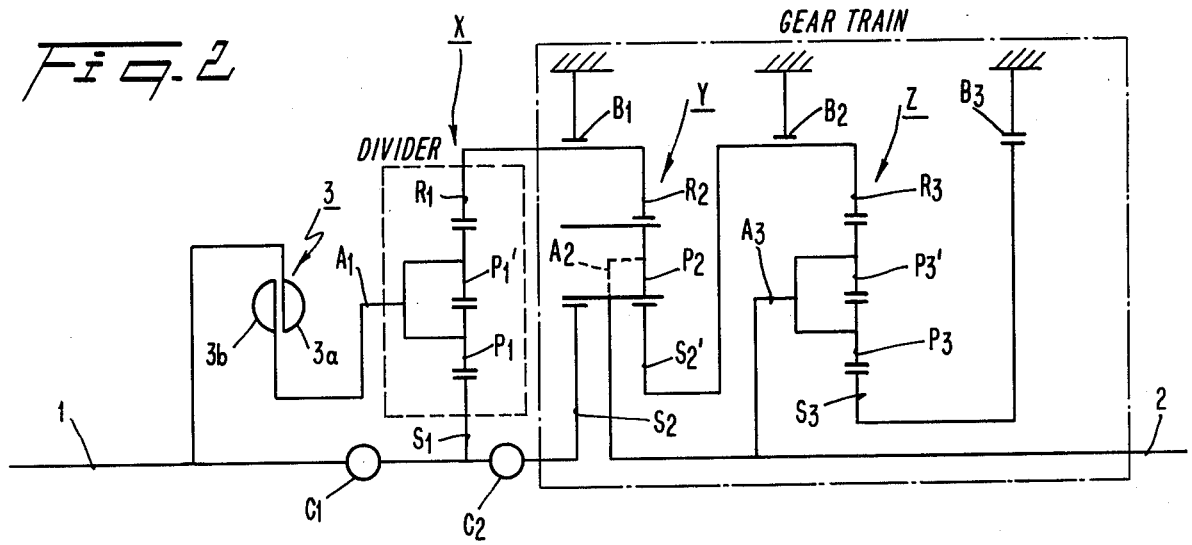

In the second embodiment shown in FIG. 2, a first planetary gear set X is a dual-intermeshed planet pinion planetary gear set which comprises a first sun gear $S_1$, a first ring gear $R_1$ and a first carrier $A_1$ rotatably carrying a plurality of pairs of intermeshing pinions $P_1$ and $P_1'$. Each pinion $P_1$ meshes with the sun gear $S_1$, while each pinion $P_1'$ meshes with the ring gear $R_1$.

Second planetary gear set Y of this embodiment is a basic planetary gear set which comprises two second sun gears $S_2$ and $S_2'$, a second ring gear $R_2$ and a carrier $A_2$ rotatably carrying a plurality of second pinions $P_2$ each meshing with both of the sun gears $S_2$ and $S_2'$ and ring gear $R_2$.

Third planetary gear set Z of this embodiment is a dual-intermeshed planet pinion planetary gear set which comprises a third sun gear $S_3$, a third ring gear $R_3$ and a third carrier $A_3$ rotatably supporting a plurality pairs of intermeshed pinions $P_3$ and $P_3'$. Each pinion $P_3$ meshes with the sun gear $S_3$, while each pinion $P_3'$ meshes with ring gear $R_3$.

In the first planetary gear set X of this embodiment, the following equation holds.

$$N_{R1} - \alpha_1 N_{S1} = (1-\alpha_1)N_{A1} \qquad (4)$$

In the second and third planetary gear sets Y and Z of this embodiment, the above equations (2) and (3) hold, respectively.

The transmission comprises an input shaft 1 supplying driving torque and a hydrokinetic unit in the form of a hydraulic torque converter 3 having a pump 3a connected to the input shaft 1 for simultaneous rotation therewith. A turbine 3b is connected to carrier $A_1$ for simultaneous rotation therewith. Sun gear $S_1$ is connectable to input shaft 1 through a first clutch $C_1$ and connectable also to sun gear $S_2$ through a second clutch $C_2$. Ring gear $R_1$ and ring gear $R_2$ are connected to each other for simultaneous rotation and are brakeable by means of a first brake $B_1$. Sun gear $S_2'$ is connected to ring gear $R_3$ for simultaneous rotation therewith and the combination may be braked by means of a second brake $B_2$. Carriers $A_2$ and $A_3$ are connected to output shaft 2 for simultaneous rotation therewith and sun gear $S_3$ is brakeable by means of a third brake $B_3$.

The operating sequence of the two clutches $C_1$ and $C_2$ and three brakes $B_1$, $B_2$ and $B_3$ is tabulated in Table 2 on the assumption that $\alpha_1 = \alpha_2 = \alpha_3 = 0.45$.

TABLE 2

| | $C_1$ | $C_2$ | $B_1$ | $B_2$ | $B_3$ | | Gear Ratio | Direct Transmission Rate (%) |
|---|---|---|---|---|---|---|---|---|
| 1st speed | | 0 | | | 0 | $\dfrac{1+\alpha_2}{1-\alpha_1}$ | 2.636 | 0 |
| 2nd speed | 0 | | | | 0 | $1+\alpha_2$ | 1.430 | 45 |
| 3rd speed | 0 | | | 0 | | $1+\alpha_2\alpha_3$ | 1.202 | 45 |
| 4th speed | 0 | 0 | | | | 1.0 | 1.000 | 62 |
| Rev. | | 0 | | | 0 | $-\dfrac{\alpha_1(1+\alpha_2)}{\alpha_2(1-\alpha_1)}$ | $-2.636$ | 0 |

Figure 3:
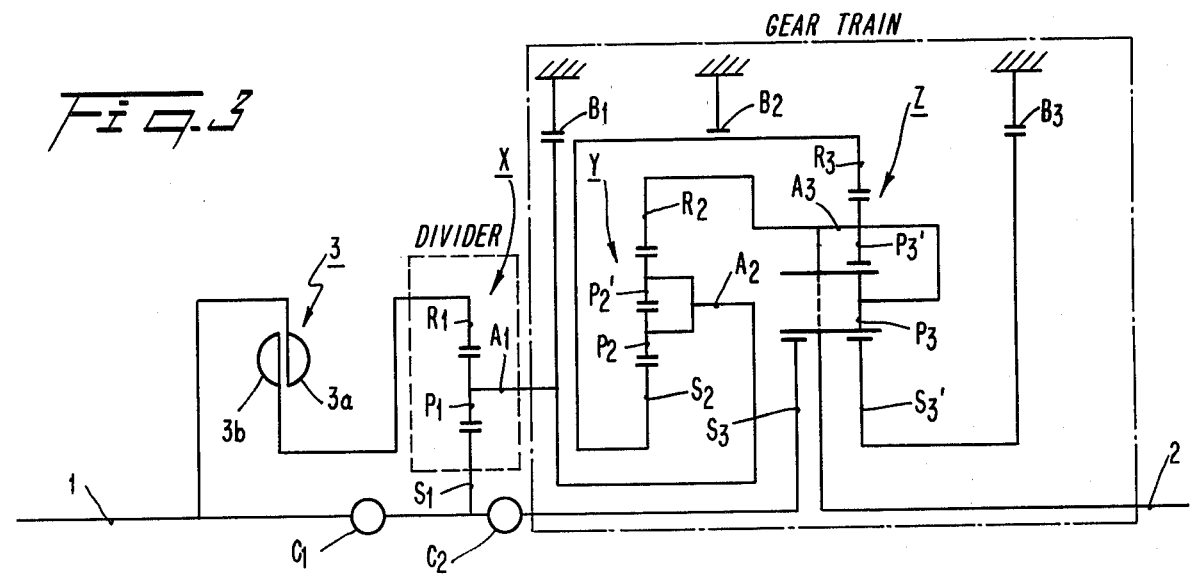

In the third embodiment shown in FIG. 3, a first planetary gear set X and a third planetary gear set Z are a basic planetary gear set and a dual-intermeshed planet pinion planetary gear set similar to those of the first embodiment, respectively. A second planetary gear set Y is a dual-intermeshed planet pinion planetary gear set which comprises a second sun gear $S_2$, a second ring gear $R_2$ and a second carrier $A_2$ rotatably supporting a plurality pairs of intermeshing pinions $P_2$ and $P_2'$. Each pinion $P_2$ meshes with the sun gear $S_2$, each pinion $P_2'$ meshes with the ring gear $R_2$.

Equations (1) and (3) hold for the first and third planetary gear sets X and Z of this embodiment. In the second planetary gear set Y of this embodiment, the following equation holds.

$$N_{R2} - \alpha_2 N_{S2} = (1-\alpha_2)N_{A2} \qquad (5)$$

Explaining different structural portions of this embodiment from FIG. 1 embodiment, the carrier $A_1$ and carrier $A_2$ are connected to each other for simultaneous rotation and they are brakeable by means of a first brake $B_1$, and ring gear $R_2$ and carrier $A_3$ are connected to each other for simultaneous rotation.

The operating sequence of two clutches $C_1$ and $C_2$ and three brakes $B_1$, $B_2$ and $B_3$ of this embodiment is tabulated in Table 3 on the assumption that $\alpha_1 = \alpha_2 = \alpha_3 = 0.45$.

TABLE 3

| | $C_1$ | $C_2$ | $B_1$ | $B_2$ | $B_3$ | | Gear Ratio | Direct Transmission Rate (%) |
|---|---|---|---|---|---|---|---|---|
| 1st speed | | 0 | | | 0 | $\dfrac{1+\alpha_1}{1-\alpha_2} + \dfrac{\alpha_1}{\alpha_3}(1-\alpha_3)$ | 3.186 | 0 |

TABLE 3-continued

| | $C_1$ | $C_2$ | $B_1$ | $B_2$ | $B_3$ | | Gear Ratio | Direct Transmission Rate (%) |
|---|---|---|---|---|---|---|---|---|
| 2nd speed | 0 | | | 0 | | $\dfrac{1}{1-\alpha_2}$ | 1.818 | 31 |
| 3rd speed | 0 | | | | 0 | $\dfrac{1-\alpha_2(1-\alpha_3)}{1-\alpha_2}$ | 1.386 | 31 |
| 4th speed | 0 | 0 | | | | 1.0 | 1.000 | 49.6 |
| Rev. | | 0 | 0 | | | $-\dfrac{\alpha_1(1-\alpha_2+\alpha_2\alpha_3)}{\alpha_2\alpha_3}$ | −1.672 | 0 |

In the fourth embodiment shown in FIG. 4, a first planetary gear set X is a dual-intermeshed planet pinion planetary gear set which has two first sun gears $S_1$ and $S_1'$. A second planetary gear set Y is a basic planetary gear set having two second ring gears $R_2$ and $R_2'$; and a third planetary gear set Z is a basic planetary gear set which has a ring gear $R_3$, a sun gear $S_3$ and a carrier $A_3$ rotatably supporting a plurality of pinions $P_3$ each meshing with both the ring gear $R_3$ and sun gear $S_3$.

Equations (4) and (2) hold for the first and second planetary gearings X and Y, while the following equation holds for the third planetary gearing Z.

$$N_{R3} + \alpha_3 N_{S3} = (1+\alpha_3)N_{A3} \qquad (6)$$

This transmission also comprises an input shaft 1, a hydraulic torque converter 3 having a pump 3a connected to the input shaft 1 for simultaneous rotation therewith and a turbine 3b connected to the carrier $A_1$ for simultaneous rotation therewith. Sun gear $S_1'$ is connectable to input shaft 1 through a first clutch $C_1$, while another sun gear $S_1$ is connectable to ring gear $R_3$ through a second clutch $C_2$. Ring gear $R_3$ is brakeable by means of a first brake $B_1$. Ring gear $R_1$, sun gear $S_3$ and ring gear $R_2'$ are connected to each other for simultaneous rotation. Carrier $A_3$ and sun gear $S_2$ are connected to each other for simultaneous rotation and are brakeable by means of a second brake $B_2$. Ring gear $R_2$ is brakeable by means of third brake $B_3$. Carrier $A_2$ is connected to output shaft 2 for providing the output torque.

The operating sequence of two clutches $C_1$ and $C_2$ and three brakes $B_1$, $B_2$ and $B_3$ of this transmission is tabulated in Table 4 on the assumption that $\alpha_1 = \alpha_2 = \alpha_3 = 0.45$.

TABLE 4

| | $C_1$ | $C_2$ | $B_1$ | $B_2$ | $B_3$ | | Gear Ratio | Direct Transmission Rate (%) |
|---|---|---|---|---|---|---|---|---|
| 1st speed | | 0 | | | 0 | $\dfrac{(1+\alpha_1\alpha_3)(1+\alpha_2)}{1-\alpha_1}$ | 3.170 | 0 |
| 2nd speed | 0 | | | 0 | | $1 + \alpha_2$ | 1.450 | 55 |
| 3rd speed | 0 | | 0 | | | $\dfrac{(1+\alpha_3)(1+\alpha_2)}{1+\alpha_2\alpha_3+\alpha_3}$ | 1.272 | 55 |
| 4th speed | 0 | 0 | | | | 1.0 | 1.000 | 57 |
| Rev. | | 0 | | | 0 | $-\dfrac{\alpha_1(1+\alpha_2)(1+\alpha_3)}{\alpha_2(1-\alpha_1)}$ | −3.823 | 0 |

In the fifth embodiment shown in FIG. 5, a first planetary gear set X is a basic planetary gear set, while, second and third planetary gear sets Y and Z are dual-intermeshed planet pinion planetary gear sets.

Equations (1), (5) and (3) hold for the first, second and third planetary gear sets X, Y and Z, respectively.

This embodiment of the transmission has an input shaft 1, a torque converter 3 having a pump 3a connected to the input shaft 1 for simultaneous rotation therewith and a turbine 3b connected to carrier $A_2$ for simultaneous rotation therewith. The pump 3a is connectable to sun gear $S_2$ through a first clutch $C_1$. The sun gear $S_1$ is connectable to sun gear $S_2$ through a second clutch $C_2$. Sun gear $S_1$ is brakeable by means of a first brake $B_1$. Carrier $A_1$ and ring gears $R_2$ and $R_3$ are connected to one another for simultaneous rotation and they are brakeable by means of a second brake $B_2$. Ring gear $R_1$ and sun gear $S_3$ are connected to each other for simultaneous rotation and they are brakeable by brake $B_3$. Carrier $A_3$ is coupled to out shaft 2 for providing the output torque.

Figure 14:
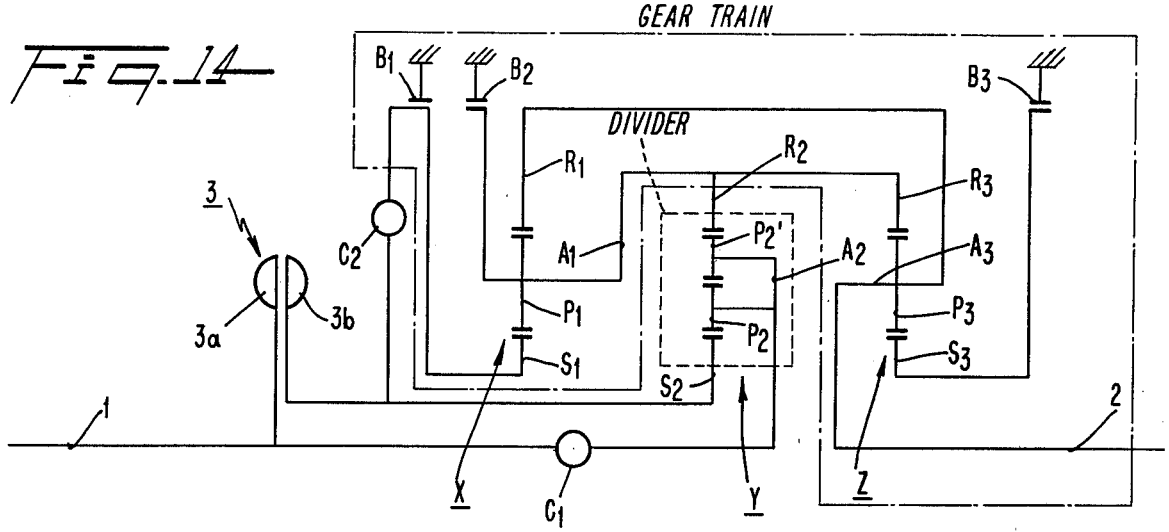

In this embodiment, the planetary gear train (dash-dot lines) is made up of gear sets X and Z and the divider (dashed lines) is formed by gear set Y (See also embodiments of FIGS. 8 and 14).

The operating sequence of two clutches $C_1$ and $C_2$ and three brakes $B_1$, $B_2$ and $B_3$ is tabulated in Table 5 on the assumption that $\alpha_1 = 0.55$, $\alpha_2 = 0.45$ and $\alpha_3 = 0.35$.

TABLE 5

| | $C_1$ | $C_2$ | $B_1$ | $B_2$ | $B_3$ | | Gear Ratio | Direct Transmission Rate (%) |
|---|---|---|---|---|---|---|---|---|
| 1st speed | 0 | | 0 | | | $\dfrac{1-\alpha_3}{(1-\alpha_2)\{1-\alpha_3(1+\alpha_1)\}}$ | 2.583 | 0 |
| 2nd speed | 0 | | | 0 | | $\dfrac{1-\alpha_3}{1-\alpha_3(1+\alpha_1)}$ | 1.421 | 45 |
| 3rd speed | 0 | 0 | | | | 1.0 | 1.000 | 55 |
| 4th speed | 0 | | | | 0 | $1-\alpha_3$ | 0.650 | 45 |
| Rev. | | 0 | 0 | | | $-\dfrac{\alpha_2(1-\alpha_3)}{\alpha_1\alpha_3(1-\alpha_2)}$ | $-2.763$ | 0 |

In the sixth embodiment shown in FIG. 6, first and a second planetary gear sets X and Y are dual-intermeshed planet pinions planetary gear sets, while, a third planetary gear set Z is a dual-intermeshed planet pinion planetary gear set with two ring gears $R_3$ and $R_3'$.

Equations (4), (5) and (3) hold for first, second, and third planetary gear sets X, Y and Z of this transmission embodiment.

This transmission comprises an input shaft providing the input torque, a torque converter 3 having a pump 3a connected to the input shaft 1 for simultaneous rotation therewith, and turbine 3b connected to carrier $A_1$ for simultaneous rotation therewith. The pump 3a is connectable to sun gear $S_1$ through a first clutch $C_1$. The sun gear $S_1$ is connectable to carrier $A_2$ through a second clutch $C_2$. The carrier $A_2$ is brakeable by means of a first brake $B_1$. Sun gears $S_2$ and $S_3$ are connected to each other for simultaneous rotation and are brakeable by means of a second brake $B_2$. Ring gear $R_2$ and carrier $A_3$ are connected to each other for simultaneous rotation. Ring gear $R_1$ and ring gear $R_3'$ are connected to each other for simultaneous rotation. Ring gear $R_3$ is brakeable by means of a third brake $B_3$. Carrier $A_3$ is connected to an output shaft 2 to provide the output torque.

The operating sequence of two clutches $C_1$ and $C_2$ and three brakes $B_1$, $B_2$ and $B_3$ of the transmission is tabulated in Table 6 on the assumption that $\alpha_1=\alpha_2=\alpha_3=0.45$.

spectively, while a second planetary gear set Y is a basic planetary gear set.

Equations (4), (2) and (3) hold for the first, second and third planetary gear sets X, Y and Z, respectively.

This transmission has an input shaft 1 and a hydraulic torque converter 3 having a pump 3a connected to the input shaft 1 for simultaneous rotation therewith and a turbine 3b connected to carrier $A_1$ (third rotary element of this particular embodiment) for simultaneous rotation therewith.

Pump 3a, which is connected to input shaft 1 for simultaneous rotation therewith, is connectable to sun gear $S_1$ through a first clutch $C_1$. The sun gear $S_1$ (second rotary element of this particular embodiment) is connectable to sun gear $S_2$ through a second clutch $C_2$. Ring gear $R_1$ (first rotary element of this particular embodiment) and carrier $A_2$ (first rotary element of this particular embodiment) are connected to each other for simultaneous rotation and are brakeable by means of a first brake $B_1$. Ring gear $R_2$ and sun gear $S_3$ are connected to each other for simultaneous rotation and are brakeable by means of a second brake $B_2$. Sun gear $S_2$ and carrier $A_3$ (second rotary element of this particular embodiment) are connected to each other for simultaneous rotation and are brakeable by means of a third brake $B_3$. Ring gear $R_3$ (third rotary element of this particular embodiment) is connected to an output shaft 2 for simultaneous rotation to provide the output torque.

TABLE 6

| | $C_1$ | $C_2$ | $B_1$ | $B_2$ | $B_3$ | | Gear Ratio | Direct Transmission Rate (%) |
|---|---|---|---|---|---|---|---|---|
| 1st speed | 0 | | 0 | | | $\dfrac{\alpha_3+\alpha_2(1-\alpha_3)}{\alpha_2(1-\alpha_1)}$ | 2.818 | 0 |
| 2nd speed | 0 | | | 0 | | $\dfrac{\alpha_3+\alpha_2(1-\alpha_3)}{\alpha_2}$ | 1.550 | 45 |
| 3rd speed | 0 | 0 | | | | 1.0 | 1.000 | 65 |
| 4th speed | 0 | | | | 0 | $1-\alpha_3$ | 0.55 | 45 |
| Rev. | | 0 | | 0 | | $-\dfrac{\alpha_1\{\alpha_3+\alpha_2(1-\alpha_3)\}}{\alpha_3(1-\alpha_1)(1-\alpha_2)}$ | $-2.306$ | 0 |

In the seventh embodiment shown in FIG. 7, a first planetary gear set X and a third planetary gear set Z are dual-intermeshed planet pinion planetary gear sets, re- The operating sequence of two clutches $C_1$ and $C_2$ and three brakes $B_1$, $B_2$ and $B_3$ of the transmission is tabulated in Table 7 on the assumption that $\alpha_1=0.40$, $\alpha_2=0.55$ and $\alpha_3=0.45$.

TABLE 7

|  | $C_1$ | $C_2$ | $B_1$ | $B_2$ | $B_3$ |  | Gear Ratio | Direct Transmission Rate (%) |
|---|---|---|---|---|---|---|---|---|
| 1st speed |  | 0 |  | 0 |  | $\dfrac{\alpha_1}{\alpha_3(1 - \alpha_1)(1 + \alpha_2)}$ | 2.841 | 0 |
| 2nd speed | 0 |  |  | 0 |  | $\dfrac{1}{\alpha_3(1 + \alpha_2)}$ | 1.563 | 45 |
| 3rd speed | 0 | 0 |  |  |  | 1.0 | 1.000 | 35 |
| 4th speed | 0 |  |  |  | 0 | $\dfrac{\alpha_2}{(1 + \alpha_2)(1 - \alpha_3)}$ | 0.625 | 45 |
| Rev. |  | 0 | 0 |  |  | $-\dfrac{\alpha_1}{(1 - \alpha_1)(1 - \alpha_3 - \alpha_2\alpha_3)}$ | −2.273 | 0 |

In the eighth embodiment shown in FIG. 8, first planetary gear set X and third planetary gear set Z are dual-intermeshed planet pinion planetary gear sets. Also, second planetary gear set Y is a dual-intermeshed planet pinion planetary gear set.

Equations (4), (5) and (3) hold for first, second and third planetary gear sets, respectively.

This embodiment of the transmission has an input shaft 1, a hydraulic torque converter 3 having a pump 3a connected to the input shaft 1 for simultaneous rotation therewith and a turbine 3b connected to carrier $A_2$ for simultaneous rotation therewith. The pump 3a is connectable to sun gear $S_1$ through a first clutch $C_1$. Sun gears $S_1$ and $S_2$ are connected to each other for simultaneous rotation and are connectable to carrier $A_1$ through a second clutch $C_2$. Carrier $A_1$ is brakeable by means of a first brake $B_1$. Ring gear $R_1$ and sun gear $S_3$ are connected to each other for simultaneous rotation and are brakeable by means of a second brake $B_2$. Ring gear $R_2$ and carrier $A_3$ are connected to each other for simultaneous rotation and are brakeable by means of a third brake $B_3$. Ring gear $R_3$ is connected to output shaft 2 providing the output torque.

The operating sequence of two clutches $C_1$ and $C_2$ and three brakes $B_1$, $B_2$ and $B_3$ of the transmission is tabulated in Table 8 on the assumption that $\alpha_1 = 0.60$, $\alpha_2 = 0.60$ and $\alpha_3 = 0.45$.

etary gear set which has two ring gears $R_3$ and $R_3'$ meshing with each pinion $P_3'$.

Equations (1), (2) and (3) hold for first, second and third planetary gear sets X, Y and Z, respectively.

This transmission comprises an input shaft 1, a hydraulic torque converter 3 having a pump 3a connected to the input shaft 1 for simultaneous rotation therewith and a turbine 3b connected to sun gear $S_1$ for simultaneous rotation therewith. The pump 3a is connectable to ring gear $R_1$ through a first clutch $C_1$. Sun gear $S_1$ is connected to carrier $A_3$ through a second clutch $C_2$. Carrier $A_3$ is brakeable by means of a first brake $B_1$. Carrier $A_1$, ring gear $R_2$ and ring gear $R_3$ are connected to one another for simultaneous rotation. Ring gear $R_3'$ can be braked by means of a second brake $B_2$. Sun gears $S_2$ and $S_3$ are connected to each other for simultaneous rotation and are brakeable by means of a third brake $B_3$. Carrier $A_2$ is connected to the output shaft 2 for simultaneous rotation therewith and providing the output torque of the transmission.

The operating sequence of two clutches $C_1$ and $C_2$ and three brakes $B_1$, $B_2$ and $B_3$ of this transmission is tabulated in Table 9 on the assumption that $\alpha_1 = \alpha_2 = 0.45$ and $\alpha_3 = 0.50$.

TABLE 8

|  | $C_1$ | $C_2$ | $B_1$ | $B_2$ | $B_3$ |  | Gear Ratio | Direct Transmission Rate (%) |
|---|---|---|---|---|---|---|---|---|
| 1st speed |  |  | 0 | 0 |  | $\dfrac{1}{(1 - \alpha_2)(1 - \alpha_3)}$ | 4.545 | 0 |
| 2nd speed | 0 |  |  | 0 |  | $\dfrac{1}{1 - \alpha_3}$ | 1.818 | 60 |
| 3rd speed | 0 |  | 0 |  |  | $\dfrac{1}{1 - \alpha_3 + \alpha_1\alpha_3}$ | 1.220 | 73 |
| 4th speed | 0 | 0 |  |  |  | 1.0 | 1.000 | 78 |
| Rev. |  | 0 |  |  | 0 | $-\dfrac{\alpha_2}{\alpha_3(1 - \alpha_2)}$ | −3.333 | 0 |

In the ninth embodiment shown in FIG. 9, first planetary gear set X and second planetary gear set Y are basic planetary gear sets, respectively, while, a third planetary gear set Z is a dual-intermeshed planet pinion plan-

TABLE 9

|  | $C_1$ | $C_2$ | $B_1$ | $B_2$ | $B_3$ |  | Gear Ratio | Direct Transmission Rate (%) |
|---|---|---|---|---|---|---|---|---|
| 1st speed |  | 0 |  | 0 |  | $\dfrac{1 + \alpha_2}{1 - \alpha_3}$ | 2.900 | 0 |

TABLE 9-continued

| | $C_1$ | $C_2$ | $B_1$ | $B_2$ | $B_3$ | Gear Ratio | Direct Transmission Rate (%) |
|---|---|---|---|---|---|---|---|
| 2nd speed | 0 | | | 0 | $1 + \alpha_2$ | 1.450 | 69 |
| 3rd speed | 0 | 0 | | | 1.0 | 1.000 | 90 |
| 4th speed | 0 | | 0 | | $\dfrac{\alpha_3(1 + \alpha_2)}{\alpha_2 + \alpha_3}$ | 0.763 | 69 |
| Rev. | | 0 | 0 | | $-\dfrac{\alpha_3(1 + \alpha_2)}{\alpha_2(1 - \alpha_3)}$ | −2.929 | 0 |

In the tenth embodiment shown in FIG. 10, first planetary gear set X and second planetary gear set Y are dual-intermeshed planet pinion planetary gear sets, respectively, while a third planetary gear set Z is a basic planetary gear set.

Equations (4), (5) and (6) hold for the first, second and third planetary gear sets X, Y and Z, respectively.

This transmission comprises an input shaft 1, a hydraulic torque converter 3 having a pump 3a connected to the input shaft 1 for simultaneous rotation therewith and a turbine 3b connected to a carrier $A_1$ for simultaneous rotation therewith. The pump 3a is connectable to sun gear $S_1$ of gear set X through a first clutch $C_1$. Carrier $A_1$ is selectively connectable to carrier $A_2$ through a second clutch $C_2$. The carrier $A_2$ and sun gear $S_3$ are connected to each other for simultaneous rotation and are brakeable by means of a second brake $B_2$. Ring gears $R_1$ and $R_2$ are connected to each other for simultaneous rotation and are brakeable by means of a first brake $B_1$. Sun gear $S_2$ and ring gear $R_3$ are connected to each other for simultaneous rotation and they are brakeable by means of a third brake $B_3$. Carrier $A_3$ is connected to an output shaft 2 for simultaneous rotation therewith and thus to provide the output torque.

The operating sequence of two clutches $C_1$ and $C_2$ and three brakes $B_1$, $B_2$ and $B_3$ of this transmission is tabulated in Table 10 on the assumption that $\alpha_1 = \alpha_2\alpha_3 = 0.50$.

TABLE 10

| | $C_1$ | $C_2$ | $B_1$ | $B_2$ | $B_3$ | Gear Ratio | Direct Transmission Rate (%) |
|---|---|---|---|---|---|---|---|
| 1st speed | | 0 | | 0 | $\dfrac{1 + \alpha_3}{\alpha_3}$ | 3.000 | 0 |
| 2nd speed | 0 | | | 0 | $\dfrac{(1 - \alpha_2)(1 + \alpha_3)}{\alpha_3}$ | 1.500 | 50 |
| 3rd speed | 0 | 0 | | | 1.0 | 1.000 | 67 |
| 4th speed | 0 | | | 0 | $\alpha_2(1 + \alpha_3)$ | 0.750 | 50 |
| Rev. | | 0 | 0 | | $-\dfrac{\alpha_2(1 + \alpha_3)}{1 - \alpha_2 - \alpha_2\alpha_3}$ | −3.000 | 0 |

In the eleventh embodiment shown in FIG. 11, a first planetary gear set X is a basic planetary gear set having two sun gears $S_1$ and $S_1'$ meshing with each pinion $P_1$, while a second planetary gear set Y and a third planetary gear set Z are basic planetary gear sets, respectively.

Equations (1), (5) and (6) hold for the first, second, and third planetary gear sets X, Y and Z of this transmission, respectively.

This transmission comprises an input shaft 1, a hydraulic torque converter 3 having a pump 3a connected to the input shaft 1 for simultaneous rotation therewith and a turbine 3b connected to sun gear $S_1'$ for rotation therewith. The pump 3a is connectable to ring gear $R_1$ through a first clutch $C_1$. Sun gear $S_1$ is connectable to carrier $A_2$ through a second clutch $C_2$. Carrier $A_2$ is connected to sun gear $S_3$ for simultaneous rotation therewith. Carrier $A_1$ and ring gear $R_2$ are connected to each other for simultaneous rotation and are brakeable by means of a first brake $B_1$. Carrier $A_2$ is brakeable by means of a second brake $B_2$. Sun gear $S_2$ and ring gear $R_3$ are connected to each other for simultaneous rotation and are brakeable by means of a third brake $B_3$. Carrier $A_3$ is connected to an output shaft 2 for simultaneous rotation therewith and thus providing the output torque.

The operating sequence of two clutches $C_1$ and $C_2$ and three brakes $B_1$, $B_2$ and $B_3$ of this transmission is tabulated in Table 11 on the assumption that $\alpha_1 = \alpha_2 = \alpha_3 = 0.50$.

TABLE 11

| | $C_1$ | $C_2$ | $B_1$ | $B_2$ | $B_3$ | Gear Ratio | Direct Transmission Rate (%) |
|---|---|---|---|---|---|---|---|
| 1st speed | | 0 | | 0 | $\dfrac{1 + \alpha_3}{\alpha_3}$ | 3.000 | 0 |
| 2nd speed | 0 | | | 0 | $\dfrac{(1 + \alpha_3)(1 - \alpha_2)}{\alpha_3}$ | 1.500 | 67 |
| 3rd speed | 0 | 0 | | | 1.0 | 1.000 | 89 |
| 4th speed | 0 | | 0 | | $\alpha_2(1 + \alpha_3)$ | 0.750 | 67 |

TABLE 11-continued

|  | $C_1$ | $C_2$ | $B_1$ | $B_2$ | $B_3$ |  | Gear Ratio | Direct Transmission Rate (%) |
|---|---|---|---|---|---|---|---|---|
| Rev. |  |  | 0 |  | 0 | $-\dfrac{\alpha_2(1 + \alpha_3)}{(1 - \alpha_2) - \alpha_2\alpha_3}$ | −3.000 | 0 |

In the twelfth embodiment shown in FIG. 12, first planetary gear set X and second planetary gear set Y are dual-intermeshed planet pinion planetary gear sets, respectively, while, a third planetary gear set Z is a basic planetary gear set having two sun gears $S_3$ and $S_3'$ meshing with each pinion $P_3$.

Equations (4), (5) and (6) hold for the first, second and third planetary gear sets of this transmission, respectively.

This transmission comprises an input shaft 1 supplying the input torque, a hydraulic torque converter 3 having a pump 3a connected to the input shaft 1 for simultaneous rotation therewith and a turbine 3b connected to carrier $A_1$ for simultaneous rotation therewith. The pump 3a is connectable to sun gear $S_1$ through a first clutch $C_1$. Carrier $A_1$ is connectable to sun gear $S_3$ through a second clutch $C_2$. Ring gear $R_1$ and carrier $A_2$ are connected to each other for simultaneous rotation and are brakeable by means of a first brake $B_1$. Sun gear $S_2$ and ring gear $R_3$ are connected to each other for simultaneous rotation and they are brakeable by means of a second brake $B_2$. Ring gear $R_2$ and carrier $A_3$ are connected to each other for simultaneous rotation and are connected to an output shaft 2 for simultaneous rotation therewith and thus providing the output torque. Sun gear $S_3'$ is brakeable by means of a third brake $B_3$.

The operating sequence of two clutches $C_1$ and $C_2$ and three brakes $B_1$, $B_2$ and $B_3$ of this transmission is tabulated in Table 12 on the assumption that $\alpha_1 = \alpha_2 = \alpha_3 = 0.35$.

TABLE 12

|  | $C_1$ | $C_2$ | $B_1$ | $B_2$ | $B_3$ |  | Gear Ratio | Direct Transmission Rate (%) |
|---|---|---|---|---|---|---|---|---|
| 1st speed |  |  | 0 |  | 0 | $\dfrac{1 + \alpha_3}{\alpha_3}$ | 3.857 | 0 |
| 2nd speed | 0 |  |  | 0 |  | $\dfrac{1}{1 - \alpha_2}$ | 1.539 | 35 |
| 3rd speed | 0 | 0 |  |  |  | 1.0 | 1.000 | 57 |
| 4th speed | 0 |  |  |  | 0 | $\dfrac{1 - \alpha_2(1 + \alpha_3)}{1 - \alpha_2}$ | 0.812 | 35 |
| Rev. |  |  | 0 | 0 |  | $-\dfrac{\alpha_3 + \alpha_2\alpha_3 - 1}{\alpha_2\alpha_3}$ | −4.306 | 0 |

In the thirteenth embodiment shown in FIG. 13, first planetary gear set X, second planetary gear set Y and third planetary gear set Z are dual-intermeshed planet pinion planetary gear sets, respectively.

Equations (4), (5) and (3) hold for the first, second and third planetary gear sets X, Y and Z of this transmission, respectively.

This transmission conprises an input shaft 1 supplying the input torque, a hydraulic torque converter 3 having a pump 3a connected to the input shaft 1 for rotation therewith and a turbine 3b connected to sun gear $S_1$ for simultaneous rotation therewith. The pump 3a is connectable to carrier $A_1$ through a first clutch $C_1$. Sun gear $S_1$, connected to the turbine 3b for simultaneous rotation therewith, is connectable to carrier $A_3$. The carrier $A_3$ is brakeable by means of a first brake $B_1$. Sun gears $S_2$ and $S_3$ are connected to each other for simultaneous rotation and are brakeable by means of a second brake $B_2$. Ring gear $R_1$, carrier $A_2$ and carrier $A_3$ are connected to one another for simultaneous rotation and are brakeable by means of a third brake $B_3$. Ring gear $R_2$ is connected to an output shaft 2 for simultaneous rotation therewith and thus providing the output torque.

The operating sequence of two clutches and three brakes is tabulated in Table 13 on the assumption that $\alpha_1 = \alpha_2 = 0.45$ and $\alpha_3 = 0.55$.

TABLE 13

|  | $C_1$ | $C_2$ | $B_1$ | $B_2$ | $B_3$ |  | Gear Ratio | Direct Transmission Rate (%) |
|---|---|---|---|---|---|---|---|---|
| 1st speed |  |  | 0 |  | 0 | $\dfrac{1}{(1 - \alpha_2)(1 - \alpha_3)}$ | 4.040 | 0 |
| 2nd speed | 0 |  |  | 0 |  | $\dfrac{1}{1 - \alpha_2}$ | 1.818 | 55 |
| 3rd speed | 0 | 0 |  |  |  | 1.0 | 1.000 | 75 |

TABLE 13-continued

|  | $C_1$ | $C_2$ | $B_1$ | $B_2$ | $B_3$ |  | Gear Ratio | Direct Transmission Rate (%) |
|---|---|---|---|---|---|---|---|---|
| 4th speed | 0 | 0 |  |  | $\dfrac{\alpha_3}{\alpha_2 + \alpha_3(1-\alpha_3)}$ |  | 0.788 | 55 |
| Rev. |  | 0 | 0 |  | $-\dfrac{\alpha_3}{\alpha_2(1-\alpha_3)}$ |  | -2.716 | 0 |

In the fourteenth embodiment shown in FIG. 14, first planetary gear set X and third planetary gear set Z are basic planetary gear sets, while, a second planetary gear set Y is a dual-intermeshed planet pinion planetary gear set. In this embodiment, the torque divider of the transmission is planetary gear set Y.

Equations (1), (5) and (6) hold for the first, second and third planetary gear sets X, Y and Z of this transmission, respectively.

This transmission comprises an input shaft 1 supplying the input torque, a hydraulic torque converter 3 having a pump 3a connected to the input shaft 1 for simultaneous rotation therewith and a turbine 3b connected to sun gear $S_2$ for simultaneous rotation therewith. The pump 3a is connectable to carrier $A_2$ through a first clutch $C_1$. Sun gear $S_2$, connected to the turbine 3b for simultaneous rotation therewith, is connectable to sun gear $S_1$ through a second clutch $C_2$. The sun gear $S_1$ is brakeable by means of a first brake $B_1$. Carrier $A_1$, and ring gears $R_2$ and $R_3$ are connected to one another for simultaneous rotation and are brakeable by means of a second brake $B_2$. Sun gear $S_3$ is brakeable by means of a third brake $B_3$. Ring gear $R_1$ and carrier $A_3$ are connected to each other for simultaneous rotation and are connected to an output shaft 2 for simultaneous rotation therewith and thus providing the output torque.

The operating sequence of two clutches $C_1$ and $C_2$ and three brakes $B_1$, $B_2$ and $B_3$ of this transmission is tabulated in Table 14 on the assumption that $\alpha_1=\alpha_2=0.35$ and $\alpha_3=0.50$.

TABLE 14

|  | $C_1$ | $C_2$ | $B_1$ | $B_2$ | $B_3$ |  | Gear Ratio | Direct Transmission Rate (%) |
|---|---|---|---|---|---|---|---|---|
| 1st speed |  | 0 |  |  | 0 | $\dfrac{(1+\alpha_1)(1+\alpha_3)-1}{\alpha_1}$ | 2.929 | 0 |
| 2nd speed |  | 0 |  |  | 0 | $1+\alpha_3$ | 1.500 | 65 |
| 3rd speed | 0 | 0 |  | 1.0 |  |  | 1.000 | 88 |
| 4th speed | 0 |  |  | 0 |  | $\dfrac{1}{1+\alpha_1}$ | 0.741 | 65 |
| Rev. |  | 0 | 0 |  |  | $-\dfrac{1}{\alpha_1}$ | -2.857 | 0 |

Figure 15:
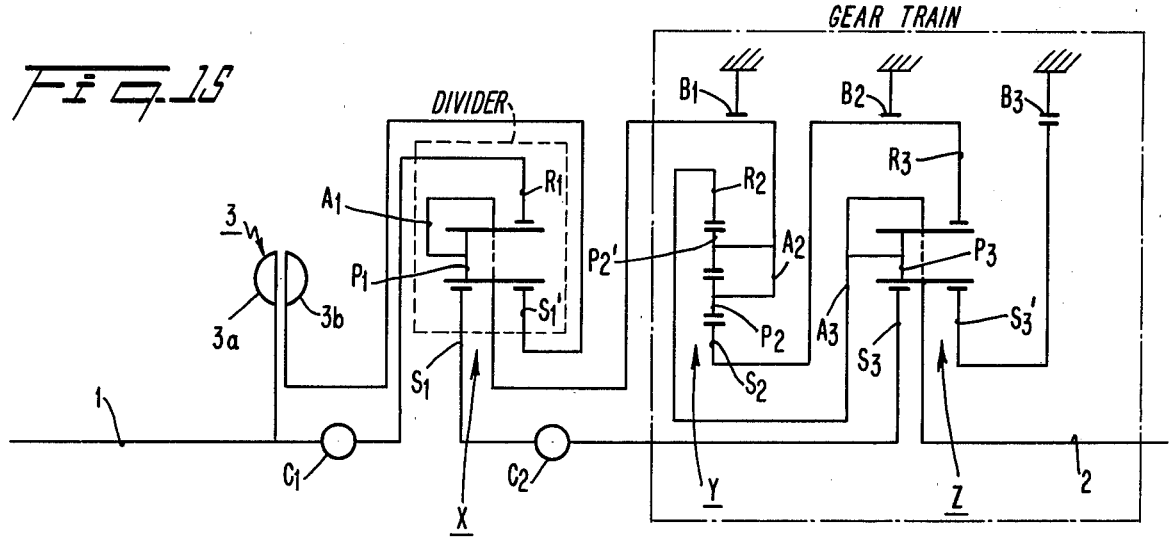

In the fifteenth embodiment shown in FIG. 15, a first planetary gear set X is a basic planetary gear set having two sun gears $S_1$ and $S_1'$ meshing with each pinion $P_1$, a second planetary gear set Y is a dual-intermeshed planet pinion planetary gear set, and a third planetary gear set Z is a basic planetary gear set having two sun gears $S_3$ and $S_3'$ meshing with each pinion $P_3$.

Equations (1), (5) and (6) hold for the first, second and third planetary gear sets X, Y and Z of this transmission, respectively.

This transmission comprises an output shaft 1 supplying the input torque, a hydraulic torque converter 3 having a pump 3a connected to the input shaft 1 for simultaneous rotation therewith and a turbine 3b connected to sun gear $S_1'$ for simultaneous rotation therewith. The pump 3a is connectable to ring gear $R_1$ through a first clutch $C_1$. Sun gear $S_1$ is connectable to sun gear $S_3$ through a second clutch $C_2$. Carrier $A_1$ and carrier $A_2$ are connected to each other for simultaneous rotation and are brakeable by means of a first brake $B_1$. Sun gear $S_2$ and ring gear $R_3$ are connected to each other for simultaneous rotation and are brakeable by means of a second brake $B_2$. Sun gear $S_3'$ is brakeable by means of a third brake $B_3$. Ring gear $R_2$ and carrier $A_3$ are connected to each other for simultaneous rotation and are connected to an output shaft 2 for simultaneous rotation therewith and providing the output torque.

The operating sequence of two clutches $C_1$ and $C_2$ and three brakes $B_1$, $B_2$ and $B_3$ of this transmission is tabulated in Table 15 on the assumption that $\alpha_1=0.45$, $\alpha_2=0.35$ and $\alpha_3=0.45$.

TABLE 15

|  | $C_1$ | $C_2$ | $B_1$ | $B_2$ | $B_3$ |  | Gear Ratio | Direct Transmission Rate (%) |
|---|---|---|---|---|---|---|---|---|
| 1st speed |  | 0 |  |  | 0 | $\dfrac{1+\alpha_3}{\alpha_3}$ | 3.222 | 0 |
| 2nd speed |  | 0 |  | 0 |  | $\dfrac{1}{1-\alpha_2}$ | 1.538 | 69 |
| 3rd speed | 0 | 0 |  |  |  | 1.0 | 1.000 | 90 |
| 4th speed | 0 |  |  | 0 |  | $\dfrac{1-\alpha_2(1+\alpha_3)}{1-\alpha_2}$ | 0.758 | 69 |

TABLE 15-continued

|  | $C_1$ | $C_2$ | $B_1$ | $B_2$ | $B_3$ | Gear Ratio | Direct Transmission Rate (%) |
|---|---|---|---|---|---|---|---|
| Rev. |  |  | 0 | 0 | $-\dfrac{\alpha_2(1+\alpha_3)-1}{\alpha_2\alpha_3}$ | $-3.126$ | 0 |

Figure 16:
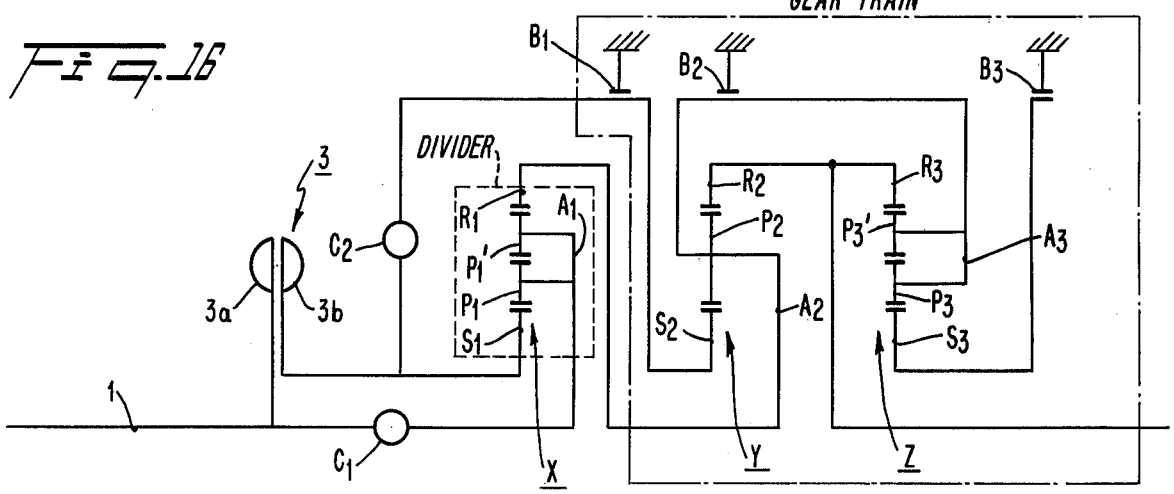

In the sixteenth embodiment shown in FIG. 16, first planetary gear set X and third planetary gear set Z are dual-intermeshed planet pinion planetary gear sets, respectively, while a second planetary gear set Y is a basic planetary gear set.

Equations (4), (2) and (3) hold for the first, second and third planetary gear sets X, Y and Z, respectively.

This transmission has an input shaft 1 supplying the input torque, a hydraulic torque converter 3 having a pump $3a$ connected to the input shaft 1 for simultaneous rotation therewith and a turbine $3b$ connected to sun gear $S_1$ for simultaneous rotation therewith. The pump $3a$ is connectable to carrier $A_1$ through a first clutch $C_1$. The sun gear $S_1$, connected to turbine $3b$ for simultaneous rotation therewith, is connectable to sun gear $S_2$ through a second clutch $C_2$. The sun gear $S_2$ is brakeable by means of a first brake $B_1$. Ring gear $R_1$, carrier $A_2$ and carrier $A_3$ are connected to one another for simultaneous rotation and are brakeable by means of a second brake $B_2$. Ring gears $R_2$ and $R_3$ are connected to each other for simultaneous rotation and are connected to an output shaft 2 for simultaneous rotation therewith and thus providing the output torque. Sun gear $S_3$ is brakeable by means of a third brake $B_3$.

The operating sequence of two clutches $C_1$ and $C_2$ and three brakes $B_1$, $B_2$ and $B_3$ of this transmission is tabulated in Table 16 on the assumption that $\alpha_1\alpha_3=0.40$ and $\alpha_3=0.35$.

TABLE 16

|  | $C_1$ | $C_2$ | $B_1$ | $B_2$ | $B_3$ | Gear Ratio | Direct Transmission Rate (%) |
|---|---|---|---|---|---|---|---|
| 1st speed |  | 0 |  | 0 | $\dfrac{\alpha_2+\alpha_3}{\alpha_2(1-\alpha_3)}$ | 2.885 | 0 |
| 2nd speed |  | 0 |  | 0 | $\dfrac{1}{1-\alpha_3}$ | 1.538 | 60 |
| 3rd speed | 0 | 0 |  |  | 1.0 | 1.000 | 84 |
| 4th speed | 0 |  | 0 |  | $\dfrac{1}{1+\alpha_2}$ | 0.714 | 60 |
| Rev. |  | 0 | 0 |  | $-\dfrac{1}{\alpha_2}$ | $-2.500$ | 0 |

In the seventeenth embodiment shown in FIG. 17, a first planetary gear set X is a basic planetary gear set, while, a second planetary gear set Y and a third planetary gear set Z are dual-intermeshed planet pinion planetary gear sets, respectively.

Equations (1), (5) and (3) hold for the first, second and third planetary gear sets X, Y and Z of this transmission.

This transmission comprises an input shaft 1 supplying the input torque, a hydraulic torque converter 3 having a pump $3a$ connected to the input shaft 1 for simultaneous rotation therewith and a turbine $3b$ connected to sun gear $S_1$ for simultaneous rotation therewith. The input shaft 1 and the pump $3a$ are connectable to ring gear $R_1$ through a first clutch $C_1$. The sun gear $S_1$, connected to turbine $3b$ for simultaneous rotation therewith, is connectable to carrier $A_2$ through a second clutch $C_2$. The carrier $A_2$ is brakeable by means of a first brake $B_1$. Sun gears $S_2$ and $S_3$ are connected to each other for simultaneous rotation and are brakeable by means of a second brake $B_2$. Carrier $A_1$, ring gear $R_2$ and carrier $A_3$ are connected to one another for simultaneous rotation and are brakeable by means of a third brake $B_3$. Ring gear $R_3$ is connected to an output shaft 2 for simultaneous rotation therewith and thus providing the output torque.

The operating sequence of two clutches $C_1$ and $C_2$ and three brakes $B_1$, $B_2$ and $B_3$ of the transmission is tabulated in Table 17 on the assumption that $\alpha_1=\alpha_2=0.50$ and $\alpha_3=0.45$.

TABLE 17

|  | $C_1$ | $C_2$ | $B_1$ | $B_2$ | $B_3$ | Gear Ratio | Direct Transmission Rate (%) |
|---|---|---|---|---|---|---|---|
| 1st speed |  | 0 |  | 0 | $\dfrac{1}{(1-\alpha_2)(1-\alpha_3)}$ | 3.333 | 0 |
| 2nd speed | 0 |  |  | 0 | $\dfrac{1}{1-\alpha_3}$ | 1.667 | 67 |
| 3rd speed | 0 | 0 |  |  | 1.0 | 1.000 | 93 |
| 4th speed | 0 |  | 0 |  | $\dfrac{\alpha_2}{\alpha_3+\alpha_2(1-\alpha_3)}$ | 0.714 | 67 |
| Rev. |  | 0 | 0 |  | $-\dfrac{\alpha_2}{\alpha_3(1-\alpha_2)}$ | $-2.500$ | 0 |

In the eighteenth embodiment shown in FIG. 18, a first planetary gear set X is a dual-intermeshed planet pinion planetary gear set, a second planetary gear set Y is a basic planetary gear set, and a third planetary gear set Z is a basic planetary gear set Z having two sun gears $S_3$ and $S_3'$ meshing with each pinion $P_3$. In this embodiment, as well as the embodiment of FIG. 19, the torque divider is the third planetary gear set Z.

Equations (4), (2) and (6) hold for the first, second and third planetary gear sets X, Y and Z of this transmission, respectively.

This transmission comprises an input shaft 1 supplying the input torque, a hydraulic torque converter 3 having a pump $3a$ connected to the input shaft 1 for simultaneous rotation therewith and a turbine $3b$ connected to ring gear $R_2$ for simultaneous rotation therewith. The pump $3a$ is connectable to sun gear $S_3$ through a first clutch $C_1$. Sun gear $S_3'$ is connectable to ring gear $R_1$ through a second clutch $C_2$. Sun gear $S_1$, carrier $A_2$ and ring gear $R_3$ are connected to one another for simultaneous rotation and are brakeable by means of a first brake $B_1$. Carrier A and sun gear $S_2$ are connected to each other for simultaneous rotation and are brakeable by means of a second brake $B_2$. Ring gear $R_1$ is brakable by means of a third brake $B_3$. Carrier $A_3$ is connected to an output shaft 2 for simultaneous rotation therewith and thus providing the output torque.

The operating sequence of two clutches $C_1$ and $C_2$ and three brakes $B_1$, $B_2$ and $B_3$ of this transmission is tabulated in Table 18 on the assumption that $\alpha_1=0.35$ and $\alpha_2=\alpha_3=0.45$.

Equations (1), (5) and (6) hold for first, second and third planetary gear sets X, Y and Z, respectively.

This transmission comprises an input shaft 1 supplying the input torque, a pump $3a$ connected to the input shaft 1 for simultaneous rotation therewith and a turbine $3b$ connected to both sun gears $S_1$ and $S_2$ for simultaneous rotation therewith. The pump $3a$ is connectable to sun gear $S_3$ through a first clutch $C_1$. The sun gear $S_3$ is connectable to carrier $A_2$ through a second clutch $C_2$. The carrier $A_2$ and carrier $A_1$ are connected to each other for simultaneous rotation and are brakeable by means of a first brake $B_1$. Ring gear $R_1$ is brakeable by means of a second brake $B_2$. Ring gears $R_2$ and $R_3$ are connected to each other for simultaneous rotation and are brakeable by means of a third brake $B_3$. Carrier $A_3$ is connected to an output shaft 2 for simultaneous rotation therewith and thur providing the output torque.

The operating sequence of two clutches $C_1$ and $C_2$ and three brakes $B_1$, $B_2$ and $B_3$ of the transmission is tabulated in Table 19 on the assumption that $\alpha_1=\alpha_2=\alpha_3=0.45$.

TABLE 19

|  | $C_1$ | $C_2$ | $B_1$ | $B_2$ | $B_3$ |  | Gear Ratio | Direct Transmission Rate (%) |
|---|---|---|---|---|---|---|---|---|
| 1st speed |  | 0 | 0 |  |  | $\dfrac{1+\alpha_3}{\alpha_2}$ | 3.222 | 0 |
| 2nd speed | 0 |  |  | 0 |  | $\dfrac{\alpha_2(1+\alpha_3)}{\alpha_3(\alpha_1+\alpha_2)}$ | 1.611 | 50 |
| 3rd speed | 0 |  |  |  | 0 | $\dfrac{(1+\alpha_3)(1+\alpha_1)}{\alpha_1+\alpha_2+\alpha_3(1+\alpha_1)}$ | 1.354 | 42 |
| 4th speed | 0 | 0 |  |  |  | 1.0 | 1.000 | 31 |
| Rev. |  | 0 |  | 0 |  | $-\dfrac{(1-\alpha_2)(1-\alpha_3)}{\alpha_2\alpha_3}$ | −3.938 | 0 |

In the operation of several embodiments of the change-speed transmission, the shift may be made from first through the fourth speeds in an obvious manner illustrated in each of the Tables 1–19. The torque path in each speed of each embodiment is simply traced

TABLE 18

|  | $C_1$ | $C_2$ | $B_1$ | $B_2$ | $B_3$ |  | Gear Ratio | Direct Transmission Rate (%) |
|---|---|---|---|---|---|---|---|---|
| 1st speed |  | 0 |  |  | 0 | $\dfrac{(1+\alpha_3)\{\alpha_1\alpha_2+(1+\alpha_2)(1-\alpha_1)\}}{1-\alpha_1}$ | 2.453 | 0 |
| 2nd speed | 0 |  |  |  | 0 | $\dfrac{(1+\alpha_3)(1-\alpha_1+\alpha_2)}{1-\alpha_1+\alpha_2(1-\alpha_1+\alpha_2)}$ | 1.526 | 47 |
| 3rd speed | 0 |  |  | 0 |  | $\dfrac{(1+\alpha_2)(1+\alpha_3)}{1+\alpha_3(1+\alpha_2)}$ | 1.273 | 39 |
| 4th speed | 0 | 0 |  |  |  | 1.0 | 1.000 | 63 |
| Rev. |  |  | 0 | 0 |  | $-\dfrac{\alpha_2(1+\alpha_3)}{\alpha_3(1-\alpha_2)}$ | −2.230 | 0 |

In the nineteenth embodiment shown in FIG. 19, first planetary gear set X and third planetary gear set Z are basic planetary gear sets, respectively, while, a second planetary gear set Y is a dual-intermeshed planet pinion planetary gear set.

through the transmission by properly considering the noted operative or inoperative condition of the clutches $C_1$, $C_2$ and brakes $B_1$, $B_2$ and $B_3$. As noted above in discussing each individual embodiment, when a clutch $C_1$, $C_2$ is noted as engaged, the two rotary elements are coupled for simultaneous rotation, and when a brake $B_1$, $B_2$, $B_3$ is noted as applied the gear and/or carrier involved is anchored against rotation.

Advantageously, the shift from one gear ratio to the other is capable of being performed smoothly. Most importantly, because of the partial direct interconnection between the input member 1 and the output member 2 in the upper gear ratios, a substantial increase in fuel economy is realized.

This transmission of the present invention also provides a wide range of gear ratios that is highly suitable for automotive use. With the use of the torque split clutch, the divider and the planetary gear train, a reduction in initial cost can be obtained in addition to holding the operating expenses to a minimum.

The overall change-speed transmission is more compact in design then previous arrangements wherein a full complement of forward gears (four speeds) and a reverse are provided. The transmission is also clearly adaptable to be manufactured in quantity since all of the rotary elements are planetary gear sets; which sets are used for both the divider and the planetary gear train.

It will also be appreciated from this description of the various preferred embodiments of the invention, that obvious changes and modifications can be made without departing from the spirit and scope of the invention.

What is claimed is:

1. A change-speed transmission comprising:
   an input member (1) to receive the input torque;
   an input member (2) to provide the output torque;
   a hydrokinetic unit (3) having a pump (3a) connected to said input member for simultaneous rotation therewith and a turbine (3b);
   a first and a second clutch;
   a divider in the form of a planetary gear set having at least a first, a second and a third rotary element;
   a planetary gear train having first and second interconnected planetary gear sets each having at least a first, a second and a third rotary element;
   said first rotary element of said divider being connected to one of said first rotary elements of said gear train for simultaneous rotation therewith;
   said second rotary element of said divider being connectable through said second clutch (C2) to one of said second rotary elements of said gear train for simultaneous rotation therewith when said clutch is engaged;
   said output member (2) being connected to one of said third rotary elements of said gear train for simultaneous rotation therewith;
   said turbine being connected to said third rotary element of said divider for simultaneous rotation therewith; and
   said input member being connectable through said first clutch (C1) to said second rotary element of said divider for simultaneous rotation therewith so as to bypass said hydrokinetic unit when said clutch is engaged;
   whereby the input torque of the input member may be split providing at least a portion of the output torque to the output member bypassing said hydrokinetic unit for increased efficiency.

2. A change-speed transmission as claimed in claim 1, in which said planetary gear set (X) of said divider comprises:
   a first sun gear ($S_1$) as said second rotary element of said divider;
   a first ring gear ($R_1$) as said third rotary element of said divider; and
   a first carrier ($A_1$) as said first rotary element of said divider, said first carrier rotatably carrying a plurality of first pinions ($P_1$), each meshing both with said first sun gear and first ring gear; in which said planetary gear train comprises:
   a second planetary gear set (Y) which comprises
   a second sun gear ($S_2$);
   a second ring gear ($R_2$) as said first rotary element of said gear train; and
   a second carrier ($A_2$) rotatably carrying a plurality of second pinions ($P_2$), each meshing both with said second sun gear and second ring gear; and
   a third planetary gear set (Z) which comprises
   two third sun gears ($S_3$, $S_3'$) as said second rotary element of said gear train;
   a third ring gear ($R_3$) connected to said second sun gear ($S_2$) for simultaneous rotation therewith; and
   a third carrier ($A_3$) as said third rotary element of said gear train, said third carrier rotatably carrying a plurality of pairs of intermeshing third pinions ($P_3$, $P_3'$), one of said intermeshing third pinions of each pair ($P_3$) meshing with both of said two third sun gears ($S_3, S_3'$), the other one of said intermeshing third pinions of each pair ($P_3'$) meshing with said third ring gear ($R_3$), said third carrier ($A_3$) being connected to said second carrier ($A_2$) for simultaneous rotation therewith; and, in which said planetary gear train further comprises:
   a first brake ($B_1$) operable to anchor said first carrier ($A_1$) and second ring gear ($R_2$);
   a second brake ($B_2$) operable to anchor said second sun gear ($S_2$) and third ring gear ($R_3$); and
   a third brake ($B_3$) operable to anchor one of said two third sun gears ($S_3'$).

3. A change-speed transmission as claimed in claim 1, in which said planetary gear set (X) of said divider comprises:
   a first sun gear ($S_1$) as said second rotary element of said divider;
   a first ring gear ($R_1$) as said first rotary element of said divider; and
   a first carrier ($A_1$) as said third rotary element of said divider, said first carrier rotatably carrying a plurality of pairs of intermeshing first pinions ($P_1,P_1'$), one of said intermeshing first pinions of each pair ($P_1$) meshing with said first sun gear ($S_1$), the other one of said intermeshing first pinions of each pair ($P_1'$) meshing with said first ring gear ($R_1$); in which said planetary gear train comprises:
   a second planetary gear set (Y) which comprises
   two second sun gears ($S_2,S_2'$) as said second rotary element of said gear train;
   a second ring gear ($R_2$) as said first rotary element of said gear train; and
   a second carrier ($A_2$) rotatably carrying a plurality of second pinions ($P_2$), each meshing with both of said two second sun gears ($S_2,S_2'$) and with said second ring gear ($R_2$); and
   a third planetary gear set (Z) which comprises
   a third ring gear ($R_3$) connected to one of said two second sun gears ($S_2'$) for simultaneous rotation therewith;
   a third sun gear ($S_3$); and
   a third carrier ($A_3$) as said third rotary element of said gear train, said third carrier rotatably carrying a plurality of pairs of intermeshed third pinions ($P_3,P_3'$), one of said intermeshing third pinions of each pair ($P_3$) meshing with said third sun gear ($S_3$), the other one of said intermeshing third pinions of each pair ($P_3'$) meshing with said third ring gear ($R_3$), said third carrier ($A_3$) being connected to said second carrier ($A_2$) for simultaneous rotation therewith;

and, in which said planetary gear train further comprises:

a first brake ($B_1$) operable to anchor said first ring gear ($R_1$) and second ring gear ($R_2$);

a second brake ($B_2$) operable to anchor said third ring gear ($R_3$) and that one of said two second sun gears ($S_2'$) which is connected to said third ring gear for simultaneous rotation therewith; and a third brake ($B_3$) operable to anchor said third sun gear ($S_3$).

4. A change-speed transmission as claimed in claim 1, in which said planetary gear set (X) of said divider comprises:

a first sun gear ($S_1$) as said second rotary element of said divider;

a first ring gear ($R_1$) as said third rotary element of said divider; and a first carrier ($A_1$) as said first rotary element of said divider, said first carrier rotatably carrying a plurality of first pinions ($P_1$), each meshing with both of said first ring gear ($R_1$) and first sun gear ($S_1$); in which said planetary gear train comprises:

a second planetary gear set (Y) which comprises a second sun gear ($S_2$);

a second ring gear ($R_2$); and a second carrier ($A_2$) as said first rotary element of said gear train, said second carrier ($A_2$) rotatably carrying a plurality of pairs of intermeshing second pinions ($P_2,P_2'$), one of said intermeshing second pinions of each pair ($P_2$) meshing with said second sun gear ($S_2$), the other one of said intermeshing second pinions of each pair ($P_2'$) meshing with said second ring gear ($R_2$); and a third planetary gear set (Z) which comprises two third sun gears ($S_3,S_3'$) as said second rotary element of said gear train;

a third ring gear ($R_3$) connected to said second sun gear ($S_2$) for simultaneous rotation therewith; and a third carrier ($A_3$) as said third rotary element of said gear train, said third carrier rotatably carrying a plurality of pairs of intermeshing third pinions ($P_3,P_3'$), one of said intermeshing third pinions of each pair ($P_3$) meshing with both of said two third sun gears ($S_3,S_3'$), the other one of said intermeshing third pinions of each pair ($P_3'$) meshing with said third ring hear ($R_3$), said third carrier ($A_3$) being connected to said second ring gear ($R_2$) for simultaneous rotation therewith;

and, in which said planteary gear train further comprises:

a first brake ($B_1$) operable to anchor said first carrier ($A_1$) and second carrier ($A_2$);

a second brake ($B_2$) operable to anchor said second sun gear ($S_2$) and third ring gear ($R_3$); and a third brake ($B_3$) operable to anchor one of said two third sun gears ($S_3'$).

5. A change-speed transmission as claimed in claim 1, in which said planetary gear set (X) of said divider comprises:

two first sun gears ($S_1,S_1'$) as said second rotary element of said divider;

a first ring gear ($R_1$) as said first rotary element of said divider; and a first carrier ($A_1$) as said third rotary element of said divider, said first carrier rotatably carrying a plurality of pairs of intermeshed first pinions ($P_1,P_1'$), one of said intermeshed first pinions of each pair ($P_1$) meshing with both of said two first sun gears ($S_1, S_1'$), the other one of said intermeshed first pinions of each pair ($P_1'$) meshing with said first ring gear ($R_1$); in which said planetary gear train comprises:

a second planetary gear set (Y) which comprises a second sun gear ($S_2$);

two second ring gears ($R_2,R_2'$) as said first rotary element of said gear train; and a second carrier ($A_2$) as said third rotary element of said gear train, said second carrier rotatably carrying a plurality of second pinions ($P_2$), each meshing with said second sun gear ($S_2$) and with both of said two ring gears ($R_2,R_2'$); and a third planetary gear set (Z) which comprises a third sun gear ($S_3$) connected to one of said two second ring gears ($R_2'$) for simultaneous rotation therewith;

a third ring gear ($R_3$) as said second rotary element of said gear train; and a third carrier ($A_3$) rotatably carrying a plurality of third pinions ($P_3$), each meshing with both of said third sun gear ($S_3$) and third ring gear ($R_3$), said third carrier ($A_3$) being connected to said second sun gear ($S_2$) for simultaneous rotation therewith;

and, in which said planetary gear train further comprises:

a first brake ($B_1$) operable to anchor said third ring gear ($R_3$);

a second brake ($B_2$) operable to anchor said second sun gear ($S_2$) and third carrier ($A_3$); and a third brake ($B_3$) operable to anchor the other one of said two second ring gears ($R_2$).

6. A change-speed transmission as claimed in claim 1, in which said planetary gear set (Y) of said divider comprises:

a first sun gear ($S_2$) as said second rotary element of said divider;

a first ring gear ($R_2$) as said first rotary element of said divider; and a first carrier ($A_2$) as said third rotary element of said divider, said first carrier rotatably carrying a plurality of pairs of intermeshing first pinions ($P_2, P_2'$), one of said intermeshing first pinions of each pair ($P_2$) meshing with said first sun gear ($S_2$), the other one of said intermeshing first pinions of each pair ($P_2'$) meshing with said first ring gear ($R_2$);

in which said planetary gear train comprises:

a second planetary gear set (X) which comprises a second sun gear ($S_1$) as said second rotary element of said gear train;

a second ring gear ($R_1$);

a second carrier ($A_1$) as said first rotary element of said gear train, said second carrier ($A_1$) rotatably carrying a plurality of second pinions ($P_1$), each meshing with both of said second sun gear ($S_1$) and second carrier ($R_1$); and a third planetary gear set (Z) which comprises:

a third sun gear ($S_3$) connected to said second ring gear ($R_1$) for simultaneous rotation therewith;

a third ring gear ($R_3$) connected to said second carrier ($A_1$) for simultaneous rotation therewith; and a third carrier ($A_3$) as said third rotary element of said gear train, said third carrier ($A_3$) rotatably carrying a plurality pairs of intermeshing third pinions ($P_3,P_3'$), one of said intermeshing third pinions of each pair ($P_3$) meshing with said third sun gear ($S_3$), the other one of said intermeshing third pinions of each pair ($P_3'$) meshing with said third ring gear ($R_3$);

and in which said planetary gear train further comprises:

a first brake ($B_1$) operable to anchor said second sun gear ($S_1$);

a second brake ($B_2$) operable to anchor said second carrier ($A_1$), first ring gear ($R_2$) and third ring gear ($R_3$); and a third brake ($B_3$) operable to anchor said second ring gear ($R_1$) and third sun gear ($S_3$).

7. A change-speed transmission as claimed in claim 1, in which said planetary gear set (X) of said divider comprises:

a first sun gear ($S_1$) as said second rotary element of said divider;

a first ring gear ($R_1$) as said first rotary element of said divider; and a first carrier ($A_1$) as said third rotary element of said divider, said first carrier ($A_1$) rotatably carrying a plurality of first pinions ($P_1$), each meshing with both of said first sun gear ($S_1$) and first ring gear ($R_1$);

in which said planetary gear train comprises:

a second planetary gear set (Y) which comprises a second sun gear ($S_2$); and second carrier ($A_2$) as said second rotary element of said gear train, said second carrier ($A_2$) rotatably carrying a plurality of pairs of intermeshing second pinions ($P_2,P_2'$), one of said intermeshing second pinions of each pair ($P_2$) meshing with said second sun gear, the other one of said intermeshing second pinions of each pair ($P_2'$) meshing with said second ring gear ($R_2$); and a third planetary gear set (Z) which comprises a third sun gear ($S_3$) connected to said second sun gear ($S_2$) for simultaneous rotation therewith;

two third ring gears ($R_3,R_3'$) as said first rotary element of said gear train; and a third carrier ($A_3$) as said third rotary element of said gear train, said third carrier ($A_3$) rotatably carrying a plurality of pairs of intermeshing third pinions ($P_3,P_3'$), one of said intermeshing third pinions of each pair ($P_3$) meshing with said third sun gear ($S_3$), the other one of said intermeshing third pinions ($P_3'$) meshing with both of said two third ring gears ($R_3,R_3'$); and, in which said planetary gear train further comprises:

a first brake ($B_1$) operable to anchor said second carrier ($A_2$);

a second brake ($B_2$) operable to anchor said second sun gear ($S_2$) and third sun gear ($S_3$); and a third brake ($B_3$) operable to anchor one of said two third ring gears ($R_3$).

8. A change-speed transmission as claimed in claim 1, in which said second rotary element of said divider is further connected to a fourth rotary element of said gear train for simultaneous rotation therewith.

9. A change-speed transmission as claimed in claim 1 in which said planetary gear set (Y) of said divider comprises:

a first sun gear ($S_2$) as said second rotary element of said divider;

a first ring gear ($R_2$) as said rotary element of said divider; and a first carrier ($A_2$) as said third rotary element of said divider, said first carrier ($A_2$) rotatably carrying a plurality of pairs of intermeshing first pinions ($P_2,P_2'$), one of said intermeshing first pinions of each pair ($P_2$) meshing with said first sun gear ($S_2$), the other one of said intermeshing first pinions of each pair ($P_2'$) meshing with said first ring gear ($R_2$); in which said planetary gear train comprises a second planetary gear set (X) which comprises a second sun gear ($S_1$) as said fourth rotary element of said gear train;

a second ring gear ($R_1$); and a second carrier ($A_1$) as said second rotary element of said gear train, said second carrier ($A_1$) rotatably carrying a plurality of pairs of intermeshing second pinions ($P_1,P_1'$), one of said intermeshing second pinions of each pair ($P_1$) meshing with said second sun gear ($S_1$), the other one of said intermeshing second pinions of each pair ($P_1'$) meshing with said second ring gear ($R_1$); and a third planetary gear set (Z) which comprises a third sun gear ($S_3$) connected to said second ring gear ($R_1$) for simultaneous rotation therewith;

a third ring gear ($R_3$) as said third rotary element of said gear train; and a third carrier ($A_3$) as said first rotary element of said gear train, said third carrier ($A_3$) rotatably carrying a plurality of pairs of intermeshing third pinions ($P_3,P_3'$), one of said intermeshing third pinions of each pair ($P_3$) meshing with said third sun gear ($S_3$), the other one of said intermeshing third pinions of each pair ($P_3'$) meshing with said third ring gear ($R_3$); and in which said planetary gear train further comprises a first brake ($B_1$) operable to anchor said second carrier ($A_1$);

a second brake ($B_2$) operable to anchor said second ring gear ($R_1$) and third sun gear ($S_3$); and a third brake ($B_3$) operable to anchor said third carrier ($A_3$).

10. A change-speed transmission comprising:

an input member (1) to receive the input torque;

an output member (2) to provide the output torque;

a hydrokinetic unit (3) having a pump (3a) connected to said input member for simultaneous rotation therewith and a turbine (3b);

a first and a second clutch;

a divider in the form of a planetary gear set having at least a first, a second and a third rotary element;

a planetary gear train having at least a first, a second and a third rotary element;

said first rotary element of said divider being connected to said first rotary element of said gear train for simultaneous rotation therewith;

said second rotary element of said divider being connectable through said second clutch ($C_2$) to said second rotary element of said gear train for simultaneous rotation therewith when said clutch is engaged;

said output member (2) being connected to said third rotary element of said gear train for simultaneous rotation therewith;

said turbine being connected to said third rotary element of said divider for simultaneous rotation therewith; and said input member being connectable through said first clutch ($C_1$) to said second rotary element of said divider for simultaneous rotation therewith so as to bypass said hydrokinetic unit when said clutch is engaged;

whereby upon engagement of said first clutch ($C_1$) the input torque of the input member may be split providing a portion of the input torque to the output member bypassing said hydrokinetic unit and providing the remaining portion of the input torque to the output member passing through said hydrokinetic unit, irrespective of the condition of said second clutch ($C_2$); and wherein said planetary gear set (X) of said divider comprises:

a first sun gear ($S_1$) as said second rotary element of said divider;

a first ring gear ($R_1$) as said first rotary element of said divider; and a first carrier ($A_1$) as said third rotary element of said divider, said first carrier rotatably carrying a plurality of pairs of intermeshing first pinions ($P_1$, $P_1'$), one of said intermeshing first pinions of each pair ($P_1$) meshing with said first sun gear ($S_1$), the other one of said intermeshing first pinions of each pair ($P_1'$) meshing with said first ring gear ($R_1$); in which said planetary gear train comprises:

a second planetary gear set (Y) which comprises a second sun gear ($S_2$) as said second rotary element of said gear train;

a second ring gear ($R_2$); and a second carrier ($A_2$) as said first rotary element of said gear train, said second carrier ($A_2$) rotatably carrying a plurality of second pinions ($P_2$), each meshing with both of said second sun gear ($S_2$) and second ring gear ($R_2$); and a third planetary gear set which comprises a third sun gear ($S_3$) connected to said second ring gear ($R_2$) for simultaneous rotation therewith;

a third ring gear ($R_3$) as said third rotary element of said gear train;

a third carrier ($A_3$) rotatably carrying a plurality of pairs of intermeshing third pinions ($P_3$, $P_3'$), one of said intermeshing third pinions of each pair ($P_3$) meshing with said third sun gear ($S_3$), the other one of said intermeshing third pinions of each pair ($P_3'$) meshing with said third ring gear ($R_3$), said third carrier ($A_3$) being connected to said second sun gear ($S_2$) for simultaneous rotation therewith; and, in which said planetary gear train further comprises a first brake ($B_1$) operable to anchor said first ring gear ($R_1$) and second carrier ($A_2$);

a second brake ($B_2$) operable to anchor said second ring gear ($R_2$) and third sun gear ($S_3$); and a third brake ($B_3$) operable to anchor said third carrier ($A_3$) and second sun gear ($S_2$).

11. A change-speed transmission comprising:

an input member (1) to receive the input torque;

an output member (2) to provide the output torque;

a hydrokinetic unit (3) having a pump ($3a$) connected to said input member for simultaneous rotation therewith and a turbine ($3b$);

a first and a second clutch;

a divider in the form of a planetary gear set having at least a first, a second and a third rotary element;

a planetary gear train having first and second planetary gear sets each having at least a first, a second and a third rotary element;

said first rotary element of said divider being connected to said first rotary element of said first gear set of said gear train for simultaneous rotation therewith;

said second rotary element of said divider being connectable through said second clutch ($C_2$) to said second rotary element of said second gear set of said gear train for simultaneous rotation therewith when said clutch is engaged;

said output member (2) being connected to said third rotary element of said second gear set of said gear train for simultaneous rotation therewith;

said turbine being connected to said third rotary element of said divider for simultaneous rotation therewith; and said input member being connectable through said first clutch ($C_1$) to said second rotary element of said divider for simultaneous rotation therewith so as to bypass said hydrokinetic unit when said clutch is engaged;

whereby the input torque of the input member may be split providing at least a portion of the output torque to the output member bypassing said hydrokinetic unit for increased efficiency.

* * * * *